United States Patent [19]

King et al.

[11] Patent Number: 5,753,148

[45] Date of Patent: May 19, 1998

[54] CARBURETOR NEEDLE VALVE ADJUSTMENT LIMITER CAP APPARATUS AND METHOD OF ADJUSTING FUEL FLOW

[75] Inventors: Eric L. King, Cass City; George M. Pattullo, Caro, both of Mich.; Karl P. Richter, Sahuarita, Ariz.

[73] Assignee: Walbro Corporation, Cass City, Mich.

[21] Appl. No.: 696,693

[22] Filed: Aug. 14, 1996

Related U.S. Application Data

[60] Provisional application No. 60/002,931 Aug. 30, 1995.

[51] Int. Cl.⁶ .................................................. F02M 3/08
[52] U.S. Cl. ...................... 261/71; 261/DIG. 38; 261/DIG. 84; 137/382
[58] Field of Search ................. 261/DIG. 84, DIG. 38, 261/71; 137/382

[56] References Cited

U.S. PATENT DOCUMENTS

| | | | |
|---|---|---|---|
| 2,618,473 | 11/1952 | Whitford | 261/41 |
| 3,321,195 | 5/1967 | Korte | 261/DIG. 84 |
| 3,618,906 | 11/1971 | Charron | 261/41 |
| 4,097,561 | 6/1978 | Seki et al. | 261/41 |
| 4,120,918 | 10/1978 | Codling | 261/DIG. 84 |
| 4,242,290 | 12/1980 | Hendelsman et al. | 261/41 |
| 4,246,929 | 1/1981 | Wakeman | 261/DIG. 84 |
| 4,271,095 | 6/1981 | Maeda | 261/41 |
| 4,283,353 | 8/1981 | Miller | 261/41 |
| 4,333,891 | 6/1982 | Miller | 261/41 |
| 5,055,238 | 10/1991 | Araki | 261/35 |
| 5,236,634 | 8/1993 | Hammett | 261/71 |
| 5,252,261 | 10/1993 | Gerhardy | 261/DIG. 84 |
| 5,322,645 | 6/1994 | Hammett et al. | 261/71 |
| 5,525,267 | 6/1996 | Araki | 261/DIG. 84 |

FOREIGN PATENT DOCUMENTS

| | | | |
|---|---|---|---|
| 2548226 | 5/1976 | Germany | 261/DIG. 84 |
| 5510455 | 6/1980 | Japan . | |
| 142650 | 10/1980 | Japan . | |

*Primary Examiner*—Tim R. Miles
*Attorney, Agent, or Firm*—Barnes, Kisselle, Raisch, Choate, Whittemore & Hulbert

[57] ABSTRACT

A needle valve limiter cap of single-stage and two stage types having a hollow cylindrical outer body of rigid material, carrying a limiter arm. A spring steel hollow retainer clip sleeve is telescopically received in the body and has inwardly and outwardly protruding resilient barbs reversely oriented relative to one another to respectively engage the cap body and the needle valve shank to respectively prevent retrograde relative telescopic motion between the clip and the body and between the clip and valve shank. Easy seating of the single or two-stage caps into their locked first and/or second stage needle adjustment positions also produces an audible click and feel as the inwardly protruding spring barb(s) snap into a needle shank groove or grooves. A cap living-hinge type anti-tamper flap at the cap end prevents access of any adjustment tool to a needle valve head. A "peanut clip" cap orientor and holder encircles the cap bodies to hold them in a paired side-by-side subassembly for storage, shipment and/or telescopic installation and rotational orientation of the caps simultaneously on their respective needle valve shanks. A peanut clip stop leg automatically halts initial push-on assembly of the paired cap bodies and peanut clip at first stage position. Cap limiter arm entrapment extensions on the holder clip lock the caps angularly in rich-rich orientation only in first stage position. Improved forms of needle valves with shank grooves, cooperating barb retaining shoulders, an anti-pry-off cap abutment conical shoulder and anti-tamper adjustment head cooperate with the limiter caps.

68 Claims, 11 Drawing Sheets

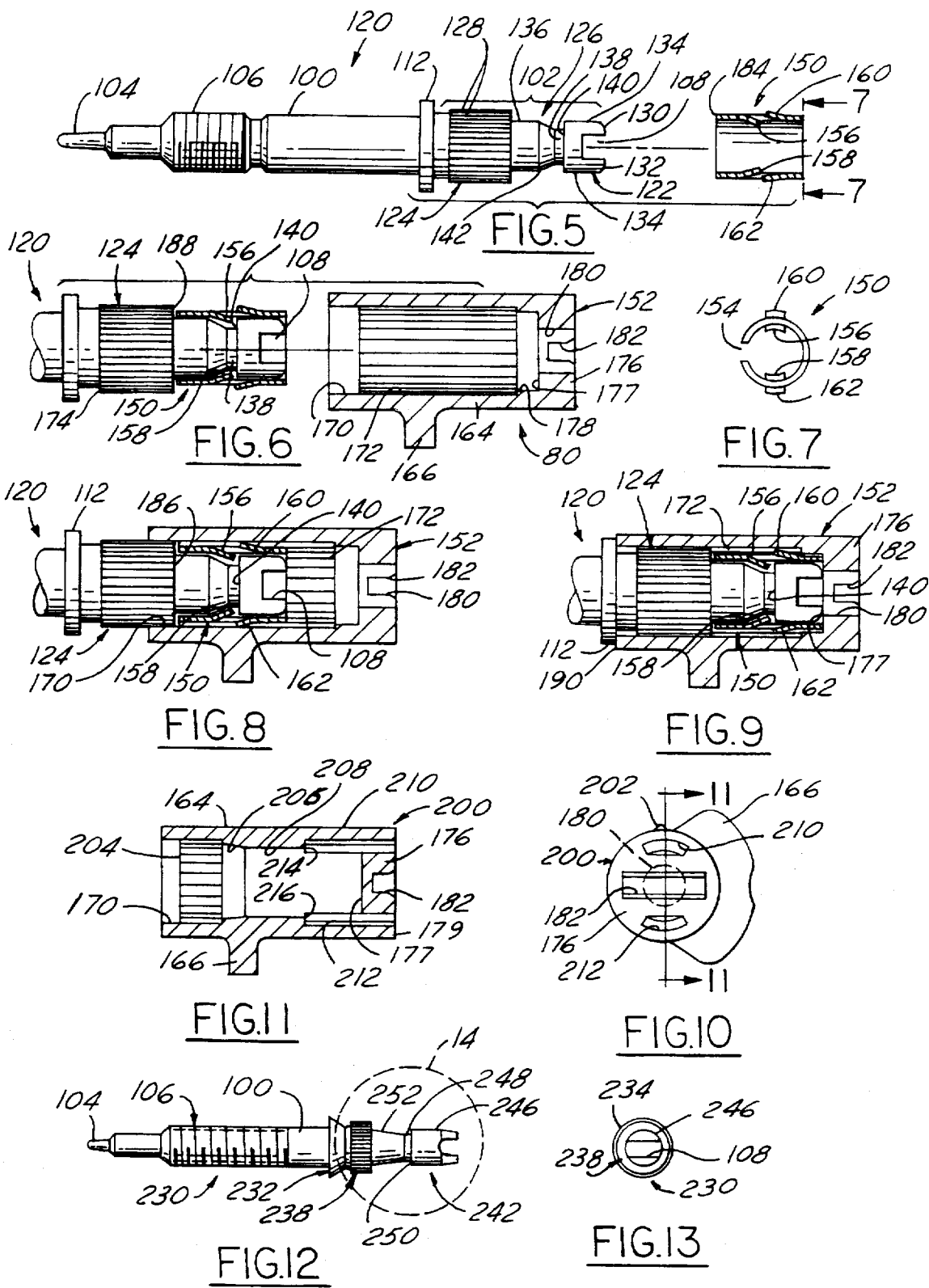

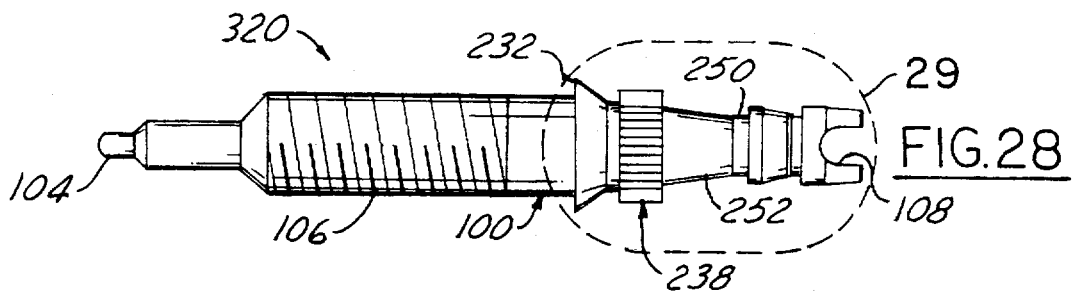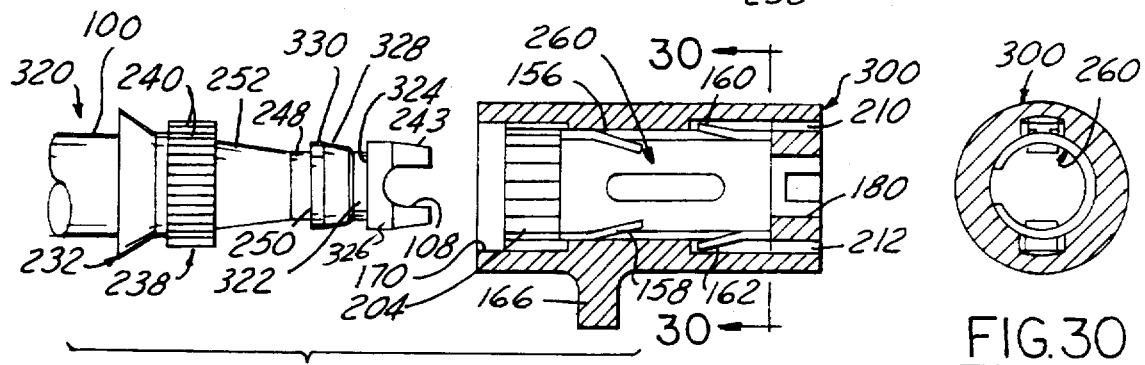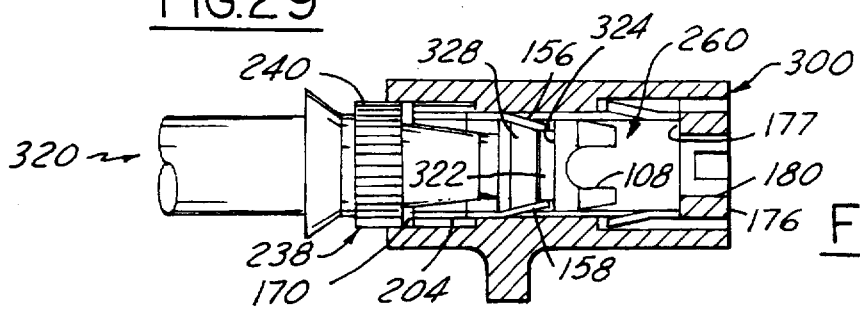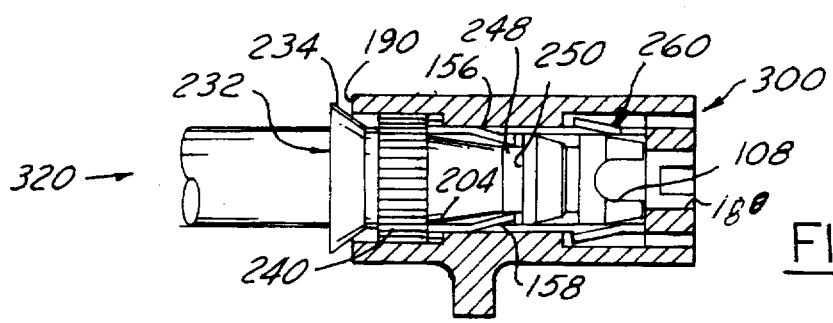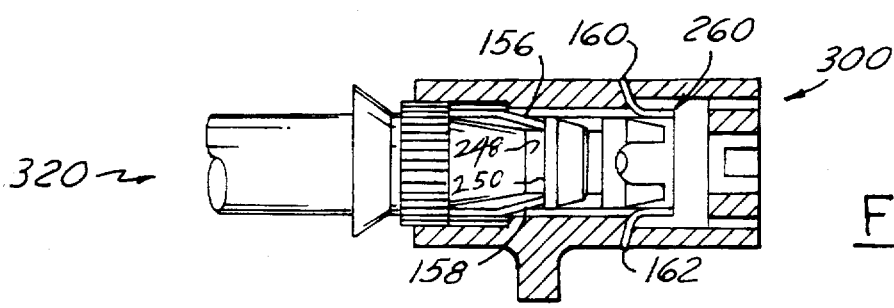

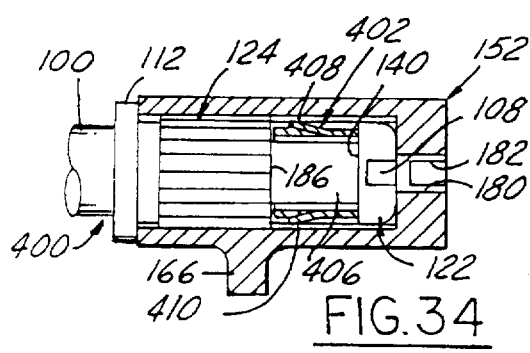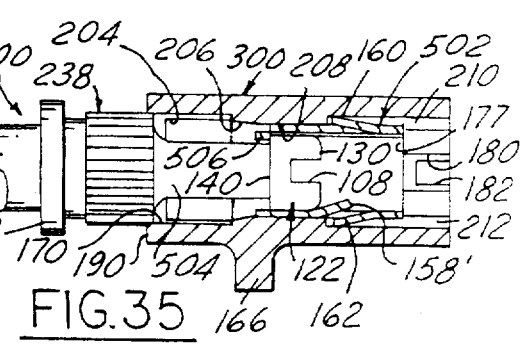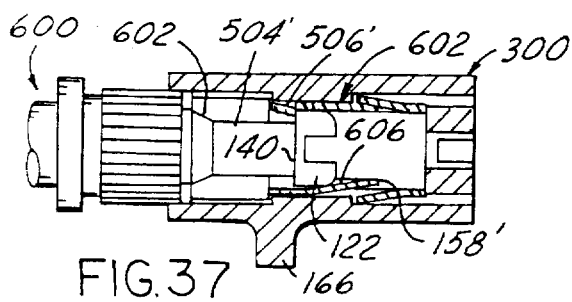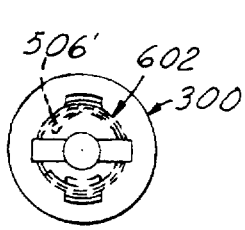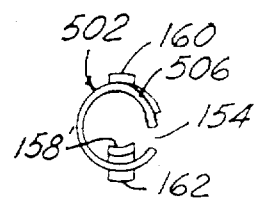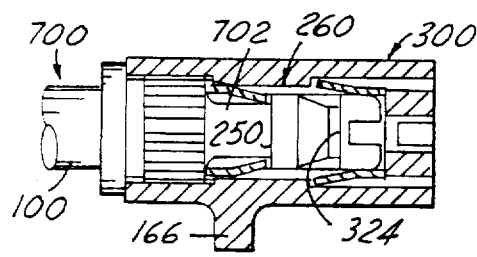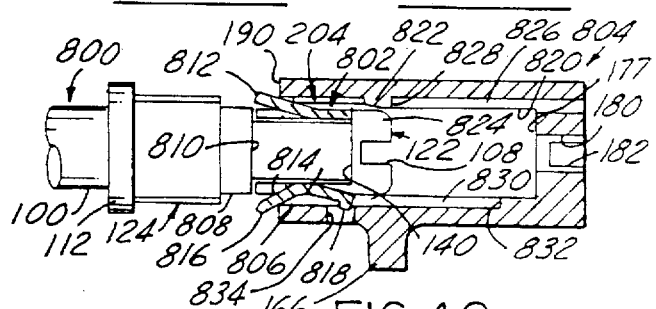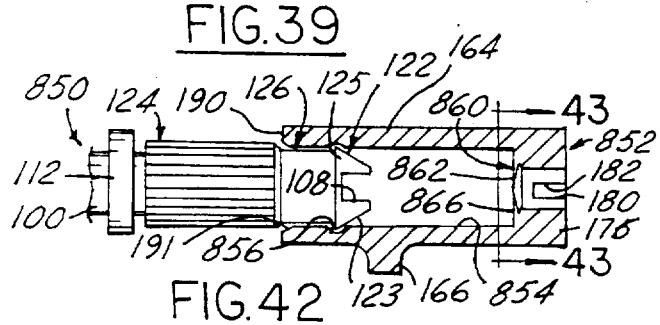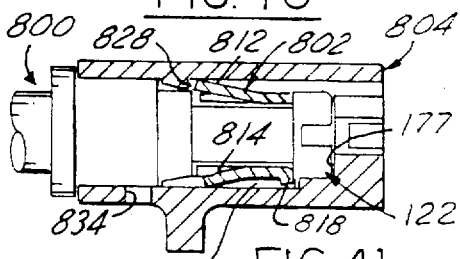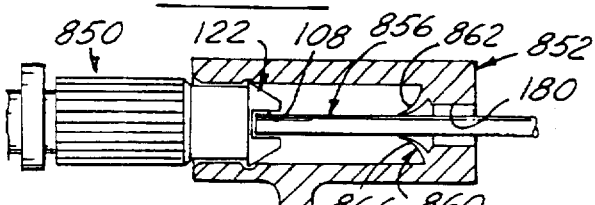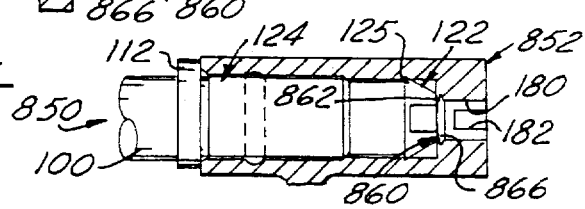

CARBURETOR NEEDLE VALVE ADJUSTMENT LIMITER CAP APPARATUS AND METHOD OF ADJUSTING FUEL FLOW

This application claims the benefit under 35 USC §119(e) of U.S. Provisional application Ser. No. 60/002,931, filed Aug. 30, 1995.

FIELD OF THE INVENTION

This invention relates to carburetors for internal combustion engines and more particularly to a limiter of the rotational adjustment a fuel flow metering valve of the carburetor.

BACKGROUND OF THE INVENTION

In response to relatively recent federal and state "clean air" regulations, carburetor limiter caps have been used to restrict carburetor fuel flow metering valve adjustment to prevent the excessive emission of carbon monoxide and unburned hydrocarbons from internal combustion engine. Primarily, limiters have been used with conventional float bowl carburetors to control automobile exhaust emissions. More recently their use has been extended to diaphragm-type carburetors in small engines simply to prevent gross misadjustment of fuel flow. However, future emissions regulations are expected to extend the role of limiter caps to control engine emissions.

Fuel flow within a carburetor is commonly metered during no load or idle engine operation by an "idle" or "low speed" needle valve and during part or full load operation by "main" or "high speed" needle valve. Typically, each valve has a threaded cylindrical body with an enlarged knurled head at one end and a conical or needle shaped valve control surface at the opposite end which is received within an opening in the carburetor body. To calibrate fuel flow, each valve is rotatively adjusted to axially extend or retract the valve control surface within a fuel passage in the carburetor until optimum fuel flow through the passage is achieved. Pre-calibration of the carburetor on a flow test bench may be performed prior to being assembled to an engine. Subsequent improper over adjustment of fuel flow by the engine-powered-appliance end-user is prevented by affixing a limiter cap over the head of each valve. After assembly to an engine, it is customary to adjust the metering valves, if needed, to fine tune fuel flow to actual engine demand. These limiter caps generally consist of a cylindrical body having an opening at one end for axially receiving the valve head in tight fitting engagement to prevent removal and ensure rotation of both in unison. A recess in the opposite end of the cap is provided to enable an adjustment tool to engage the valve directly or the cap alone to rotate both in unison to make fuel flow adjustments. Projecting radially outwardly from the cap body is an arm for abutting against a fixed stop extending from the carburetor to limit valve rotation. Representative limiter caps are described in U.S. Pat. 3,618,906 Charron and U.S. Pat. 5,055,238 Araki.

Stop members such as an integrally cast projection of the carburetor or the body of another cap press-fit on an adjacent needle valve may be used to limit valve and cap rotation and hence adjustment. Similarly, Japanese Patent Publication Kitsuko Sho 61-134555, discloses a hollow cylindrical collar limiter which has an outwardly extending arm for abutting directly against the head of an adjacent valve to limit adjustment.

Additional representative prior art patents are U.S. Pats. Nos. 2,618,473; 3,321,195; 4,097,561; 4,242,290; 4,271,095; 4,283,353; 4,333,891; 5,236,634; 5,322,645; Japanese Application 55-142650; Japanese Application 55-104556; and German Offenlegungsschrift 25 48 226.

Previous to the use of these limiting devices, fuel flow metering valves in carburetors were freely adjustable without limitation, and such limiters were not universally adopted for carburetors for small engine applications. Particularly, because of numerous difficulties, caps of conventional construction had not been used in applications, such as hand-held tools like weed trimmers, hedgers, blowers, chain saws, and hedge trimmers, where carburetor access is restricted by an engine shroud enclosing the engine compartment.

Although access openings are provided in the shroud by a grommet to adjust each valve, they are not large enough to allow limiter cap installation after final calibration without removing the shroud. Further, limited accessibility adds to the difficulty of accurately orienting the arm of the cap with respect to the optimum valve position and the stop or stops of the carburetor to provide the appropriate range of adjustability. Removal and reorientation of the cap, after calibration with the cap secured to the valve, is impractical and time consuming as it would require the application of considerable force to remove the limiter, possibly damaging the cap. Production time may also be lost if the shroud or grommet must be disassembled to gain sufficient access to the cap. Unfortunately, disturbing the valve in this manner to remove the cap would likely require recalibration before reinstalling the same or a different limiter cap.

For example, if a two-cycle engine is sold with the adjustment range incorrectly set, subsequent user adjustment toward rich could increase emissions, or if toward lean deprive the engine of lubrication entrained in the fuel flow leading to overheating or even catastrophic failure. In any event, a user or operator of the power tool may lack the necessary range of fuel flow adjustment to keep the engine efficiently operating under the full range of temperature, humidity, altitude or other engine operating conditions which may be encountered.

With or without an enclosure or shroud, assembly and proper orientation of these caps is difficult and requires considerable dexterity. If improperly oriented, its tamper proof construction virtually prevents removal without damaging the cap and disturbing the optimum fuel flow setting of the valve.

U.S. Pat. 5,236,634 Hammett et al ('634) and U.S. Pat. 5,322,645 Hammett et al ('645), both assigned to Walbro Corporation (assignee of record herein), disclose and claim improvements in limiter caps and methods of adjusting fuel flow which successfully overcome such problems, and are incorporated herein by reference.

The limiter caps of the '634 and '645 patents have operated successfully in commercial use to restrict adjustment of a valve to prevent excessive engine exhaust emissions and engine overheating or failure. They facilitate quick and easy assembly of the cap to a needle valve of a carburetor body and final calibration of the carburetor while operating on an engine without requiring the removal of the grommet and engine shroud after final carburetor calibration. These limiter caps may be individually installed after initial calibration of an assembled carburetor on a flow test bench and prior to performing final engine factory calibration of the carburetor on an engine.

They also allow assembly of the limiter cap onto a needle valve of the carburetor to enable rotational adjustment of each valve during carburetor calibration, simple and accurate positioning of the arm of each cap relative to the final adjusted positioned of the valve and carburetor stops, and easy assembly of the cap into secure locking engagement with the valve to allow rotation of the cap and valve only in unison while limiting rotational adjustment of the valve in either direction.

After being locked on they allow limited fuel flow adjustment to enable a user of an engine powered tool to adequately adjust carburetor performance to fine tune engine operation under a variety of operating conditions while preventing fuel flow over adjustment which otherwise could cause excessive exhaust gas emissions or engine overheating. The prepositioning feature allows quick and easy limiter arm orientation, after the caps are mounted in a freely rotating position on the valve, to expediently, yet accurately, fix the allowable range of valve rotation. Another advantage is that the cap may be carried on the valve during assembly without dislodging or vibrating free.

Despite the numerous features and advantages of the limiter cap and methods of adjusting fuel flow of the invention as disclosed and claimed in the aforementioned '634 and '645 patents, there nevertheless remains the longstanding and ongoing need to further reduce manufacturing and material costs of both the limiter caps and associated needle valves, to further simplify, facilitate and render more economical the handling, shipment, storage and installation of such caps on the associated needle valves as well as the adjustment of fuel flow using the needle valve, all without substantially modifying the outer shape and configuration of the type of limiter caps of the '634 and '645 patents. There is also an ongoing need to improve the function and operation of the limiter cap in association with the needle valve and to render the same more versatile as to choice of material usable in constructing the limiter cap. In addition there is the longstanding and overriding need to improve the construction of such limiter caps to enhance their tamper proof characteristics to meet present and proposed governmental and industry standards in this regard. In addition, there is a need to eliminate, or at least simplify and render more economical, the needle-valve anti-rotation springs (such as springs 72 shown in the '634 and '645 patents). There is also a need to be able to remove the caps, but only by authorized personnel, and without damaging the caps and/or needle valves.

OBJECTS OF THE INVENTION

Accordingly, it an object of the present invention to provide improved limiter cap, needle valve, and cap orientor constructions and improved methods of utilizing the same, in the form of various alternative and/or cooperatively combinable embodiments, which satisfy the aforementioned needs, while still satisfying most if not all of the objects and retaining the describe features and advantages of the limiter cap embodiments and methods of the aforementioned '634 and '645 patents.

SUMMARY OF THE INVENTION

In general, and by way of summary description and not by way of limitation, the invention accomplishes the foregoing objects by providing various improved embodiments of needle valve limiter caps and methods of constructing and using the same in which the limiter cap is of two-piece construction comprising a hollow cylindrical outer body carrying the limiter arm and a spring material retainer clip telescopically received within the outer body. The retainer clip in the form of a hollow sleeve provided with inwardly and outwardly protruding resilient barbs reversely oriented relative to one another to respectively engage the cap body and the needle valve shank to respectively prevent, on the one hand, retrograde relative telescopic motion between the clip and the body, and on the other hand, between the clip and valve shank. Preferably the clip sleeve is split lengthwise to define a parting gap therein, and the sleeve has a free state diameter greater than that of the body so as to be readily compressible to ensmall the sleeve diameter to facilitate telescopic insertion of the sleeve into the cap body passage. Due to this two-piece construction the clip can be made of spring metal material whereas the cap body can be made of either relatively rigid plastic material or metal. By transferring the resilient, spring locking function from the cap body plastic material to the metal retainer clip, less press-on force is required to telescope the limiter cap subassembly onto the needle valve shank, but the limiter cap can not be removed from the needle, except by authorized personnel using a special tool, without destroying the cap. Moreover, if the cap body is made of metal material, even destructive removal is forestalled.

The two-piece limiter cap construction is provided in one embodiment as a single stage cap for installation only to a locked-on position after engine factory fine tune adjustment with the cap off. In other embodiments a two stage type cap is provided for preassembly to the needle valve to a first position, allowing presetting paired caps to a rich-rich position, while permitting rotational adjustment of the needle valve during engine fine tuning. After such adjustment the cap or caps are then pushed further onto the needle to lock the caps and needle for co-rotation to thereby define a predetermined and more limited end-user range of rotational adjustment of the needle valves. The seating of the single or two-stage caps in their locked first and/or second stage positions is made apparent to the installer by an audible click as the inwardly protruding spring barb(s) snap into a needle shank groove after riding over the needle head, and with a two-stage cap, subsequently riding over a second stage retaining shoulder on the needle shank.

To further enhance the anti-tamper characteristics of both the one-piece limiter caps of the '634 and '645 patents as well as the two-piece limiter caps of this invention, various embodiments of living-hinge type anti-tamper flaps are provided at the outer end of the cap body. The flap is movable open by inserting a needle valve adjustment tool into the cap body with the needle in the first stage position. After such adjustment and removal of the tool, the cap is moved into second stage position so that the needle valve locks the flap closed to thereby prevent access of any adjustment tool to needle valve head.

To further facilitate engine customer installation of paired low and high speed limiter caps (of both the '634/'635 patent type as well as those of this invention) on the associated side-by-side low and high speed needle valves, the invention further provides various embodiments of "peanut clip" cap orientors and retainers. Both of the cap bodies are individually telescopically inserted into the peanut clip so that it encircles the cap bodies and spans a space therebetween to securely and conveniently hold the caps in a paired side-by-side subassembly for storage, shipment and/or telescopic installation and rotational orientation of the caps simultaneously on their respective needle valve shanks while still held by the peanut clip. The peanut clip then may be removed from the caps once the same are installed in final position, or the clip may be permanently retained on the caps as by orienting the cap limiter arms to capture the peanut clip therebetween by a flanking relationship to the cap limiter arms. The peanut clip is constructed to permit individual limited-range rotation of the caps for end-user engine tuning adjustment while also sufficiently restraining cap rotation so that needle settings are retained by clip restraint of the caps, either supplemental to or in lieu of the usual needle springs, to thereby prevent undesired rotation of the needles induced by engine operation vibration.

Preferably, for use with two-stage type limiter caps, the peanut clip is constructed with a stop leg that ensures that initial push-on assembly of the subassembly of peanut clip and paired cap bodies held therein onto the needle ends is automatically stopped at the first stage installation position. After engine fine tuning adjustment by the engine manufacturer with the caps in their first stage position, the caps are directly pushed further within the clip into their locked second stage position while the clip is maintained in its initial position by its stop leg continuing to abut the carburetor body. The stop leg clip also has cap limiter arm entrapment extensions for locking the caps angularly in rich-rich orientation both prior to and after installation of the cap/clip subassembly to its first stage needle-installed position. When the caps are pushed further into the clip, from first to second stage position, the cap limiter arms are then clear of the clip extensions so that the caps (and associated needle valves) can be rotated through their limited adjustment range established by operation of the cap limiter arms.

The peanut clip may be a continuous loop of resilient but non-elastic material in which the clip peanut shape provides individual cap body gripping action for holding the caps in spaced parallel and pre-aligned relationship but also enables flexible deformation of the clip to accommodate unlocking override of orienting ribs and/or interengaging splines of the clip and cap body. In the stop leg clip embodiment a parting gap is provided in the clip opposite the stop leg to thereby form cantilever spring legs to impart resilient deformability to the clip.

Improved forms of needle valves with shank grooves and cooperating barb retaining shoulders are also provided to cooperate with the improved limiter caps of the invention. These needle valves also have a cap abutment conical shoulder against which the inner end of the cap seats in the fully installed position hinder any attempt to pry off the cap with a screw driver blade.

BRIEF DESCRIPTION OF THE DRAWINGS

The foregoing as well as other objects, features and advantages of the present invention will become apparent from the following detailed description, accompanying drawings and appended claims in which presently preferred embodiments of the invention are set forth in sufficient detail to enable a person skilled in the art to practice the invention in connection with the best mode presently known of making and using the invention.

The various views of the accompanying drawings (which are drawn to engineering scale unless otherwise indicated), may be briefly described as:

FIG. 5 is an exploded side view of a two-stage-type and first embodiment of a needle valve and cap retaining clip of a needle valve and cap retaining clip subassembly of this invention, the retaining clip being shown in axial center section;

FIG. 6 is an exploded side view of the retaining clip and needle valve of FIG. 5 assembled together and a first embodiment of a limiter cap of this invention positioned for assembly to the needle and clip subassembly, the cap being shown in axial center section;

FIG. 7 is an end view of the retaining clip of FIGS. 5 and 6 taken on the line 7—7 of FIG. 5;

FIG. 8 illustrates the cap of FIG. 6 assembled in a first stage retainer position on the clip and needle subassembly for free rotation of the cap and clip as a unit relative to the needle valve;

FIG. 9 illustrates the cap and clip of FIG. 8 non-removably secured in a fully engaged second stage limiter position on the needle valve and rotationally drivingly engaged for rotation of the cap, clip and needle valve as a unit between limiter arm stop positions;

FIG. 10 is a single-stage-type and end view of a second embodiment of a limiter cap of the invention;

FIG. 11 is a cross-sectional view taken on the line 11—11 of FIG. 10;

FIGS. 12 and 13 are side elevational and end views respectively of a second embodiment of a needle valve of the invention for use with the cap of FIGS. 10 and 11;

FIG. 28 is a side elevational view of a third embodiment needle valve of the invention for use with the clip of FIGS. 14–20 and cap of FIGS. 21–27;

FIG. 29 is an exploded side view of the portion of the needle valve encompassed by the broken line circle 29 in FIG. 28, together with the limiter cap of FIGS. 21–27 having the retaining clip of FIGS. 18–20 fully preinstalled therein;

FIG. 30 is a cross-sectional view taken on the line 30—30 of FIG. 29;

FIG. 31 illustrates the cap and retainer clip subassembly of FIG. 29 installed on the head of the needle valve in a first stage of such assembly, the cap/clip subassembly being end-user non-removably secured on the needle valve head but freely rotatable relative thereto to permit engine factory adjustment of the needle valve;

FIG. 32 illustrates the cap and retainer clip of FIG. 31 positioned in a second stage of assembly on the head of the needle valve so as to be non-removably secured thereto and with the cap, retaining clip and needle valve head rotationally drivingly interengaged for rotation as a unit between limiter arm stop positions for end-user adjustment of the needle valve;

FIG. 33 illustrates the effects of an improper end-user attempt to pull-off remove the limiter cap from the needle once installed in its FIG. 32 position;

FIG. 34 is a assembly view of a single-stage-type, fourth embodiment of a limiter cap, retaining clip and needle valve of the invention, the cap and clip being shown in longitudinal center section and the needle in fragmentary side elevation;

FIG. 35 illustrates a first stage of assembly of a two-stage-type, fifth embodiment limiter cap, retaining clip and needle valve of the invention, the cap and clip being shown in longitudinal center section and the needle valve in fragmentary side elevation;

FIG. 36 is an end elevational view of the cap and clip of FIG. 35 prior to assembly to the needle valve;

FIG. 37 illustrate a first stage of assembly of a two-stage-type, sixth embodiment of a limiter cap, retaining clip and needle valve of the invention, the cap and clip being shown in longitudinal center section and the needle valve fragmentarily in side elevation;

FIG. 38 is an end elevational view of the clip of FIG. 37 looking into the right hand end of the clip as viewed in FIG. 37;

FIG. 39 is a fragmentary side elevational view of a two-stage-type, seventh embodiment of a needle valve of the invention in fully assembled condition with the third embodiment cap and second embodiment clip of the invention;

FIG. 40 is a fragmentary side elevational view of a two-stage-type, eighth embodiment needle valve of the invention with a seventh embodiment retaining clip assembled thereon, and a seventh embodiment limiter cap of the invention installed in a first stage of assembly on the assembled needle valve and clip, the cap and clip being shown in longitudinal center section and the needle valve in side elevation;

FIG. 41 illustrates the cap, clip and needle valve of FIG. 40 in fully assembled limiter position;

FIG. 42 illustrates a two-stage-type, first embodiment of an anti-tamper flap limiter cap of the invention installed in a free rotatable first stage position on a commercial form of needle valve similar to that shown in FIG. 9 of the aforementioned '634 and '645 patents;

FIG. 43 is a cross-sectional view taken on the line 43—43 of FIG. 42;

FIG. 44 illustrates the cap and needle valve of FIG. 42 with an adjustment tool inserted into the cap to rotate the needle valve relative to the cap;

FIG. 45 illustrates the cap and needle valve of FIGS. 42–44 in their fully assembled limiter position with the cap non-removably secured on the needle and the cap and needle engaged for rotation as a unit, and with the anti-tamper flap held closed by the needle head to prevent access thereto;

DETAILED DESCRIPTION OF THE INVENTION AND MANNER AND PROCESS OF USE

Figure 1:
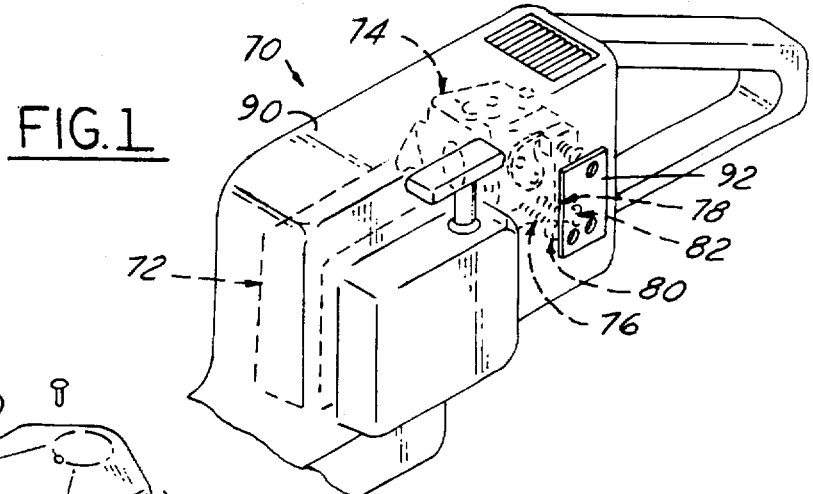
FIG. 1 is a fragmentary perspective view of a hedge trimmer having a two-cycle engine equipped with a carburetor having installed thereon fuel flow metering needle valves and limiter caps of the present invention.
Figure 2:
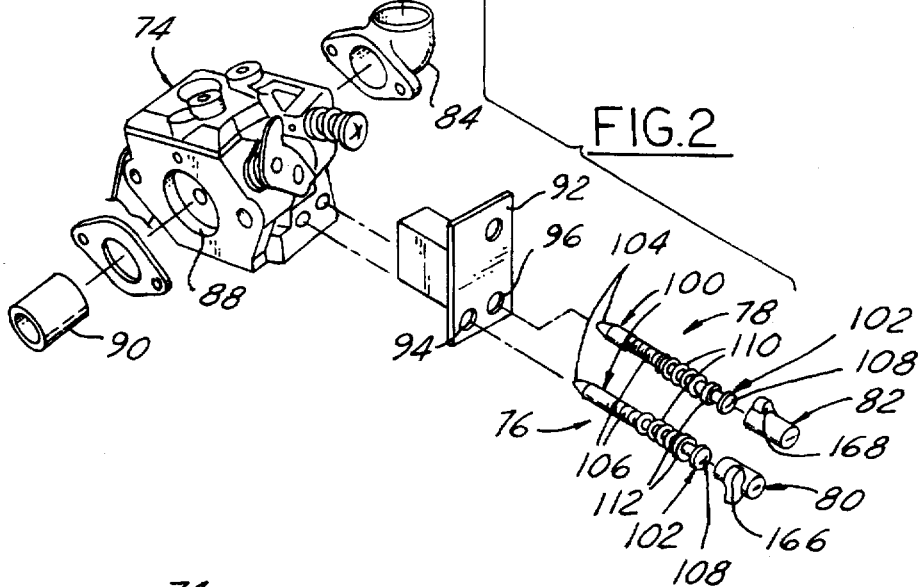
FIG. 2 is an exploded perspective view of the carburetor, main and idle needle valves, and limiter caps for each valve.

With reference to the drawings, FIGS. 1 and 2 illustrate a typical assembly of a hand-held power tool 70, such as a hedge trimmer, with a two-cycle gasoline engine 72 having a carburetor 74 equipped with idle 76 and main 78 needle valves and respectively associated limiter caps 80 and 82 of this invention. (Caps 80 and 82 are designated generally by reference numerals 80 and 82 in FIGS. 1–4, and hereinafter also separately designated in various embodiments by individually differing reference numerals.) The idle and main needle valves 76 and 78 control fuel flow during low speed and high speed engine operation respectively.

Carburetor 74 has an air inlet 84 attached to an air cleaner 86, and an outlet 88 in communication with an intake manifold 90 of engine 72. Engine 72 and carburetor 74 are enclosed by a housing or shroud 90 having a cover plate grommet 92 to shield the carburetor and engine from cuttings and other debris, and provided with a pair of access openings 94 and 96 respectively axially aligned with caps 80 and 82. Caps 80 and 82 enable limited valve adjustment and grommet 92 also hinders tampering with or removal of either cap by the end user of power tool 70. However since cover grommet 92 must be made removable for field service of needle valves 76 and 78, it does not provide a fool-proof tamper guard.

All embodiments of the needle valves of the invention as described hereinafter share certain features in common which are standard parameters of conventional carburetor needle valves. Thus, as shown in FIG. 2 each valve 76, 78 has an elongated generally cylindrical shank 100 with a head 102 at its outer end and a generally conical valve control surface 104 at its inner end. Shank 100 has a plurality of external threads 106 to engage complimentary threads (not shown) within the carburetor body to enable threaded securement of valve 76, 78 therein and axial adjustment of the needle control surfaces 104 within a fuel flow passage of the carburetor body. Typically a recess or slot 108 is provided in the outer free ends 102 of valves 76, 78 for receiving an adjustment tool, such as the blade of a screw driver, for facilitating individual rotational adjustment of valves 76, 78. Additionally or alternatively, the outer peripheral surface of heads 102 may be provided with a knurled surface (not shown) which may be engaged by a tool or gripped manually for needle valve adjustment. Unintentional valve rotation induced by engine vibration is prevented by a coil compression spring 110 encircling the valve shank 100 and abuttedly retained in compression between the side of the body of carburetor 74 and a flange 112 located on valve shank 100 adjacent valve head 102.

First Embodiment

As shown in FIGS. 5, 6, 8 and 9, the first embodiment needle valve 120 of the present invention, like needle 36 ' of FIGS. 9–15 of the '645 patent has the head portion 102 of the needle generally axially subdivided into three integral portions or segments; namely, (1) a first segment 122 at the free, outer end of the valve needle, (2) an external fluted segment 124 adjacent spring retainer flange 112 and (3) a grooved portion 126 disposed axially intermediate flute segment 124 and head segment 122. Each of these segments is made, at least initially, as a body revolution by lathe turning, preferably in an automatic screw machine or turret lathe of the CNC type. The axially extending external flutes 128 may be precision broached-formed to provide a circumferentially continuous row of axially extending spline teeth 128. Needle 120 differs from the prior needle 36 ' in this respect in that needle 36 is made with rough external flutes and having an O.D. dimension sized for an interference force fit within a yieldably resistant smooth walled portion of the plastic limiter cap 40 ' of this embodiment of the '634 and '645 patents.

The head end segment 122 of needle valve 120 is also modified in that it is axially longer and has, in addition to the screw driver cross slot 108, a conical chamfer 130 forming the transition between its flat end face 132 and a cylindrical portion 134 of head end 122. The groove segment 126 of head 102 is also modified so as to be formed with a cylindrical portion 136 adjacent flute segment 124 and having an outside diameter equal to or slightly less than that of surface 134. A cylindrical external groove 138 is formed adjacent the inner end of surface 134 of head end 122, and of smaller diameter, to thereby form a stop catch shoulder 140 having a radial surface facing toward the inner end of the needle, and preferably perpendicular to the needle axis. A conical neck portion 142 forms the transition between groove 138 and cylindrical surface 136.

In accordance with one principal feature of the present invention, in this embodiment each of the limiter caps 80 and 82 are made as two separate, one-piece parts, namely (1) a spring metal retaining clip 150 and (2) an outer plastic or metal cap 152 preferably having the same exterior configuration and dimensions as those of limiter caps 40 and 42 of the '634 and '645 patents. This first embodiment retainer clip 150 of the invention is illustrated in FIGS. 5–9, and the first embodiment limiter cap 152 designed for cooperation with clip 150 is shown in FIGS. 6, 8 and 9.

As best seen in FIGS. 5 and 7, retaining clip 150 is preferably made as a one-piece progressive die stamping, preferably from S.A.E. 1050 cold rolled steel, and has a generally cylindrical sleeve body having a C-shape in cross section perpendicular to the sleeve axis (FIG. 7) so as to have an axially continuous parting gap 154 in one side of the sleeve. Clip 150 has preferably a pair of clip-retaining inner barbs 156 and 158 oriented generally opposite one another diametrically of the sleeve and protruding at a shallow angle into the sleeve hollow interior. Clip 150 also has a pair of cap-retaining outer barbs 160 and 162 protruding at a shallow angle outwardly from the outer periphery of the sleeve and also oriented generally opposite one another diametrically of the sleeve. Barbs 156 and 160 may be struck oppositely from parallel slit cuts along the side of the barbs and shear separated to form the free ends of these barbs. Barbs 158 and 162 may be concurrently formed in a similar manner.

After clip 150 is so die-formed to have a predetermined free-state inside sleeve diameter, clip 150 is preferably heat treated to a Rockwell hardness of 45°–50° C. The finished clip 150 is thus circumferentially compressible, as permitted by ensmalling parting gap 154, from its free state diameter to a reduced cap-insertion diameter to thereby develop spring forces during such yieldable contraction of the sleeve.

The first embodiment cap 152, in accordance with a further feature of the present invention, is made in the form of a cylindrical body 164 with a segmental-type arm 166 projecting externally therefrom for limiting valve rotation and hence adjustment. Preferably, in this embodiment the cylindrical external periphery as well as shape, location and configuration of arm 166 correspond identically to the commercial form of the limiter caps 40 and 42 of the aforementioned '643 and '645 patent caps so that cap 152 can be injection molded of relatively rigid thermoplastic material, such as Delrin 500, or suitable thermosetting plastic material, with minimum tooling changes, or die cast of white metal material, and handled with minimum revisions to production fixtures, part feeders and packaging in changing over from use of the commercial form of the '643 and '645 caps. Limiter arm 166 of cap 152 is thus shown in FIGS. 2, 3 and 4, as oriented for use on the idle needle 76 to abut the periphery of the associated adjacent main needle cap 82 in non-interfering relation with the limiter arm 168 of cap 82, and vice versa, in keeping with the structure, function and mode of operation of these like elements of the '634 and '645 caps.

Cap 152 has a hollow interior with a through-passage open at axial opposite ends, which includes a cylindrical, smooth wall entrance bore 170 at the needle end of cap 152, and having a inside diameter slightly greater than the outside diameter of splines 128 of head segment 124. The through-passage of cap 152 further includes a circumferentially continuous annular row of internal, axially extending splines 172 designed to have a slip fit telescopically meshed interengagement with external splines 128 for transmitting rotational torque between cap 152 and needle 120 in either direction from rotation. Splines 172 extend axially from the inner end of entrance bore 170 toward the outer end of cap 152 a distance corresponding to the axial spacing of the inner end 174 of spline segment 124 to about the inner end of the screw driver slot 108. The outer end of cap 152 is partially closed by an end wall 176 that is spaced from the outer end of splines 172 by another smooth bore 178 having the same internal diameter as the spline teeth 172. The outer end the cap through-passage is formed by a cylindrical screw-driver access opening 180 that extends centrally through wall 176. The outer end face of wall 176 is formed with a transverse, closed-ended screw-driver blade receiving slot 182.

One mode of assembly and use of the first embodiment needle 120, retaining clip 150 and limiter cap 152 is sequentially illustrated in FIGS. 5, 6, 8 and 9. In this method, the tube type retaining clip 150 is pre-assembled to needle 120 as a first step. To do this, clip 150 is axially telescoped over needle head segment 122, with its inner barbs 158 leading outer barbs 160, 162, until the needle end 184 of clip 150 abuts the outer end 186 of needle splines 124, as shown in FIG. 6. During initial push-on insertion of the clip, bevel 130 of head segment 122 will flex the resilient inner barbs 156 and 158 outwardly until, in their travel along the segment 122, their free ends reach shoulder 140, whereupon these inner barbs will snap into acceptance groove 138. As so installed, clip 150 is free to spin on needle 120, and cannot be removed from the needle because of the catch-stop abutment of the free ends of the inner barbs 156 and 158 with needle head shoulder face 140. Typically, prior to this step, needle 120 has already been assembled into the carburetor body.

As a next step, limiter cap 152 is axially telescoped open-end-first onto the needle-mounted clip 150 to thereby press cap 152 over the needle head 102 to a predetermined first stage depth as illustrated in FIG. 8, wherein head splines 124 only axially overlap telescopically the clearance diameter entrance bore 170. During this cap installation step the free ends of outer barbs 160 and 162 will be flexed inwardly by their interference fit within internal cap splines 172. Due to their shallow sliding angle of incidence with the barrel portion of clip 150, barbs 160, 162 will readily permit cap splines 172 to slide therepast. Nevertheless, the spring force developed in so flexing barbs 160 and 162 will force the sharp edges of their free outer ends to drag along and dig slightly into the peaks of cap splines 172. Hence any reversal of push-on force, tending to pull cap 152 off of needle 120, will cause the free ends of the outer barbs 160 and 162 to dig further into the splines due to their shallow retrograde digging angle relative to the splines. Such one-way catch action of the barbs, as they dig further into the splines in direct proportion to applied pull-off force, thereby prevents such separational motion of cap 152 relative to needle 120. The outer barbs engaging the cap splines will also tend to rotational lock cap 152 to clip 150, but because needle splines 124 are not yet engaged with cap splines 172, and clip 150 can rotate freely on the needle head, cap 152 can still spin independently from needle 120.

With cap 152, clip 150, and low-speed needle assembled as shown in FIG. 8, the same installation procedure of assembling another clip 150 and cap 152 on high speed needle 78 is performed.

Next the appliance manufacture, at the engine test run station after final assembly of the engine powered appliance, performs a final adjustment of needle 120 with the engine running (i.e., idle adjustment of needle 76 and high speed adjustment of main needle 78). This is done by inserting an adjustment tool driver blade through cap opening 180 so that the blade engages with the blade slot 108 of the needle head to thereby manually rotate needle 120 as desired to optimize engine performance. When both the idle and main needle valve have been so fine tuned, usually to a rich/rich predetermined fuel/air ratio setting, the limiter caps in this embodiment (as in the '634 patent) are rotated relative to their associated needle valve to position the limiter lobes 166 and 168 as desired, as diagrammatically illustrated in FIG. 4. Typically each lobe is swung to abut against the outer periphery of mutually adjacent limiter caps to thereby set the upper limit of adjustment towards rich.

As the last OEM assembly step, each of caps is pushed to maximum installation depth on the needle, i.e., to the fully installed position shown in FIG. 9. This step may, if needed, be initially facilitated by slightly rotating cap 150 relative to needle 120 to thereby angularly register needle external splines 124 with their mating cap internal splines 172. This slip fit meshing interengagement of the external and internal splines rotationally locks cap 152 to needle 120. Hence cap 152 will no longer spin relative to needle 120 but instead now will be rotationally drivingly (bi-directionally) intercoupled therewith. During insertion movement of cap 152 from the first stage position of FIG. 8 to the second stage position of FIG. 9 the outer ends of barbs 160 and 162 will again slide along the peaks of splines 172 until the cap reaches the position of FIG. 9, wherein end wall 176 abuts the end face 132 of needle head segment 122, and/or with inner end 190 of cap 152 abuts flange 112. Power tool 70 is now ready for shipment and sale to the end user customer. Due to the limiter caps being locked on the associated needle valves, fuel flow adjustment of the carburetor is limited by the travel end stop positions of limiter arms 166 and 168, thereby insuring a limited, pre-determined range of adjustment so that the engine fuel flow cannot be made over-rich or over-lean. Hence, clean air standards are met by preventing end user over-enrichment of the fuel/air ratio during engine operation, and end-user damage to the engine by an over lean fuel/air ratio is also prevented.

It is also to be understood that the aforementioned method of installation of cap 152, clip 150 and needle 120 may be modified if desired, to a pre-installed mode of use and assembly. That is, with clip 150 preassembled by the carburetor manufacturer on needle 120 as shown in FIG. 6, the O.E.M. engine manufacture can perform the final engine-run adjustment of needle setting to optimize engine performance prior to installing limiter caps 152. Then each cap 152 can be final installed in one stage on its associated needle valve 120 so as to slip fit cap 152 to its full depth as shown in FIG. 9. In this alternative method, the orientor feature of '645 patent is utilized to pre-orient the idle and main caps with their limiter arms 166 and 168 preset to abut in a lock up position. Hence it is not necessary to spin caps 152 relative to their associated needles at the intermediate stage of FIG. 8 in order to position this limiter arms 166 and 168 for final push-on needle/cap lock-up.

In either event, when cap 152 is fully installed on needle 120 as shown in FIG. 9, the cap will no longer spin relative to the needle due to the meshing of the external and internal splines, and will not pull off because the inner barbs prevent removal of the clip from the needle head and the outer barbs prevent removal of the cap from the clip.

Second Embodiment of Limiter Cap, Needle Valve and Retaining Clip

FIGS. 11 through 20 illustrate a modified second embodiment limiter cap 200, needle valve 230 and retaining clip 260 which have many of the features of the first embodiment needle 120, clip 150 and cap 152 described previously but which enable the retaining clip to be preassembled to the limiter cap in a fully secure manner prior to the installation of the limiter cap on the needle. As before, elements alike to previously described elements are given like reference numerals and their description not repeated.

Reference should also be made to FIGS. 21–27, which illustrate a third embodiment cap 300 that is identical to cap 200 except that cap 300 retains the screw driver through hole 180 of cap 152, whereas in cap 200 the access through-hole 180 is eliminated so that the end wall of cap 200 does not provide access for an adjustment tool.

Preferably, the exterior dimensions and configuration of both caps 200 and 300 may be identical to those of cap 152 as well as to the prior commercial caps made in accordance with the aforementioned '634 and '645 patents to provide maximum compatibility with existing part tooling as well as manufacturing fixtures, assembly procedures, etc. In addition, caps 200 and 300 are preferably provided with an external, axially extending orienting rib 202 corresponding to the orienting ribs 118, 120 described in conjunction with FIGS. 25 and 25A of the aforementioned '645 patent.

The interior configuration of caps 200 and 300 is modified from that of cap 152 in that the circular row of internal splines 204 (FIGS. 11, 25 and 27) extend axially inwardly of the passage from the clearance bore 170 a distance of only about 25% of the length of cap spline teeth 172. At the passage-interior side of teeth 204 a conical transition counterbore 206 tapers from the inside diameter of spline 204 to a smaller diameter main bore 208 having a smooth cylindrical wall slightly smaller in diameter than spline 204 (e.g., 3.80 mm versus 4.09 mm) and which extends to the interior face 177 of cap end wall 176.

Caps 200 and 300 also differ from cap 152 in having a pair of axially extending, diametrically opposite barb-receiving locking grooves 210 and 212. These grooves extend axially from the outer face 179 of end wall 176 parallel to the central axis of body 164 and terminate interiorly of the body at groove end stop walls 214 and 216 respectively. The cross sectional configuration of each groove 210, 212 is best seen in the enlarged view of FIG. 23. It will be seen that each groove 210, 212 is defined by a curved root wall 217 concentric with the outer surface of body 164 and extending circumferentially of the cap about 60°. Root wall 217 is flanked by radially extending side walls 218 and 220, and each groove continues as a passageway through end wall 176 having the additional flat wall 222. This passageway provides for core insertion and retraction in molding or casting of grooves 210 and 212 in caps 200, 300.

Figure 14:
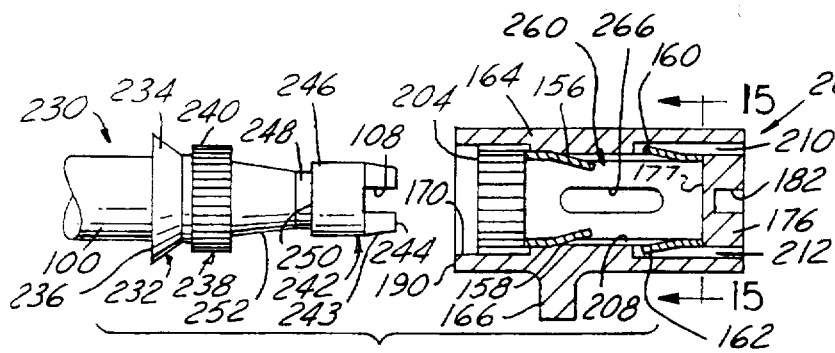
FIG. 14 is an exploded perspective view of the second embodiment needle valve and cap, with a second embodiment retaining clip fully preinstalled in the cap, and only showing that portion of the needle valve encompassed by the circle 14 in FIG. 12.
Figure 15:
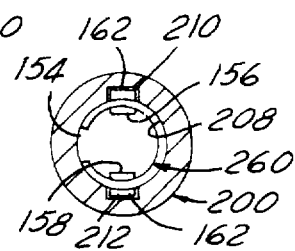
FIG. 15 is a cross-sectional view taken on the line 15—15 of FIG. 14.

Referring to FIGS. 12, 13 and 14, the second embodiment needle valve 230 is similar to needle 120 but modified therefrom with respect to the spring stop flange and configuration of the needle head area. As best seen in FIGS. 13 and 14, the spring stop flange 232 of needle 230 is trapezoidal in cross section, having a conical periphery 234 tapering downwardly from its spring stop face 236 to merge with shank 100 toward the head of the needle. The spline segment portion 238 of needle 230 is provided with spline teeth 240 designed for a slip fit driving mesh interengagement with internal spline teeth 204 of caps 200, 300, and having an axial length slightly shorter than that of teeth 204. The head segment 242 of needle 230 is also slightly modified so as to have a relatively long, slightly tapered (e.g., 16° included angle) conical nose portion 243 running from the head end face 244 to merge with the cylindrical shank 246 of head 242. The clip inner barb acceptance groove 248 of needle 230 is similar to groove 138 of needle 120 and forms the barb stop surface 250 at its junction with head segment 242. A slightly tapered conical portion 252 is formed between groove 248 and spline segment 238 (e.g., included angle of 15°).

Figure 18:
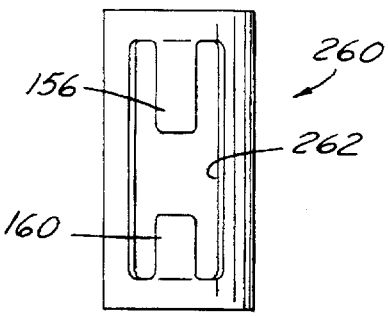
FIGS. 18 and 19 are top plan and end elevational views respectively of the retaining clip of FIGS. 14–17 and enlarged thereover and shown in free-state condition.

The second embodiment retainer clip 260 (FIGS. 14–20) is similar to retainer clip 150 as to its mode of manufacture, materials and spring characteristics, but is axially elongated relative to clip 150 to correctly position the inner and outer barbs for cooperation with caps 200 and 300. As best seen in FIGS. 18 and 20, the inner barb 156 and outer barb 158 extend towards one another from the opposite ends of a rectangular slot 262, so that the mutually facing ends of these barbs are axially spaced apart a correct distance to cooperate with the head configuration of needle 230 and the interior configuration of caps 200 and 300 in the manner illustrated in FIGS. 14, 16 and 17. The same is true of inner barb 158 and outer barb 162. Again, clip 260 is made to be diametrically oversized relative to cap bore 208 in its free state, and is circumferentially compressible to ensmall parting cap 154 to develop spring stress as its diameter is reduced for slip fit insertion into caps 200, 300. Preferably, an axially elongated oval slot 266 (FIGS. 14 and 20) is punched in the side wall of the clip barrel diametrically opposite the parting gap 154 to reduce the squeeze force required to diametrically ensmall of the clip for cap insertion.

In assembly and use of limiter cap 200, needle 230 and retaining clip 260, with each of these parts final formed as described above, the first step is to preassemble retaining clip 260 in cap 200, outer-barb-end first into the open end of the cap. To facilitate such insertion, the tubular clip is squeezed to diametrically ensmall the same and the leading end of the clip is inserted into and past the internal spline 204, and then either all the way into the final position in FIG. 14, or at least until the leading end of the clip is engaged with the taper surface 206 of the cap bore. The tail end of the cap can then be pushed to cause tapering surface 206 to contract the cap diametrically as it is slid along the cap main bore 208 until the leading and of the cap strikes cap end wall surface 177. During this movement, the outer barbs 160 and 162 are squeezed by camming bore 206 and resiliently yield to retract flush with the tubular wall of clip main bore 208. The outer ends of the barbs slide along the wall surface until they register with the inner end walls 214 and 216 of lock grooves 210 and 212. The barbs are thereupon snapped outwardly by the spring force of the barbs toward their free state condition into locking position in the grooves as illustrated in FIG. 14. Clip 260 is then locked against axial displacement in the cap by end wall 176 and the interference between outer barbs 160, 162 and slot end walls 214 and 216. Preferably, prior to insertion of clip 260 into cap 200, the outer barbs are angularly aligned with the lock grooves 210, 212. However, if not, after full insertion of clip 260 into the cap 200 the clip can be rotated relative to the cap with a screw driver blade until the outer barbs register with and spring out into the lock grooves 210, 212 to angularly lock the two parts together.

The preassembled cap/clip 200/260 may thus be supplied to the OEM engine manufacturing customer as an inventory item for use in fine tuning of the engine when test run after assembly with the carburetor mounted thereon. After OEM fine tuning engine adjustment to maximum permissible rich setting of both idle and needle valves 30, cap/clip 200/260 is assembled open-end-first, one over the head of each needle, to the position shown in FIG. 16. As the cap is slid over the head of the needle, the taper nose surface 243 of the needle head will slide between inner barbs 156, 158, thereby springing them apart as the head cylindrical surface 246 slides therepast. When the external splines 240 of the head meet the internal splines 204 of the cap the same are angularly aligned for slip fit telescopic mesh. If not initially so aligned for mesh, the fine pitch of the spline teeth wall require only a few degrees of relative rotation between needle 230 and cap 200 to orient the splines for mesh alignment.

Figure 16:
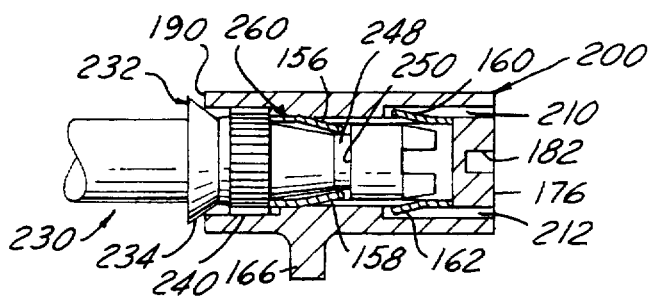
FIG. 16 illustrates the cap and clip subassembly of FIG. 14 fully assembled on the head of the needle valve and non-removably secured thereon for rotation of the cap, retaining clip and needle valve as a unit between limiter arm stop positions.

Once the lock shoulder 250 of the needle head moves inwardly past the free ends of inner barbs 156, 158, they spring into the needle acceptance groove 248, thereby producing an audible clicking sound due to this snap action. This occurs just prior to the open inner end 190 of cap 200 striking the conical stop surface 234 of needle flange 232 (FIG. 16). Cap 200 is thus fully assembled on the needle end with one easy, slip on motion, achieved with only light push force, to fully locked position. With the needle and cap splines now meshed the cap and needle are rotationally drivingly interengaged so that rotational adjustment of needle valve 230 can only be accomplished by rotation of limiter cap 200. Hence the end user of the power tool 70 can only adjust the idle and main needles 76 and 78 within the range permitted by the limiter arms 166 and 168 of the side-by-side-needle valves.

Preferably, and in accordance with the aforementioned '634 and '645 patents, the idle and main limiter caps 80 and 82 in all of the embodiments disclosed herein are provided as a paired subassembly with the limiter arms 166 and 168 rotated to mutually stopped positions corresponding to rich/rich in accordance with the orienting features of the aforementioned '645 patent, and further as a preoriented subassembly prior to conjoint installation on the side-by-side needle valves, in accordance with the orienting peanut clip features described hereinafter in conjunction with FIGS. 55–76.

Figure 17:
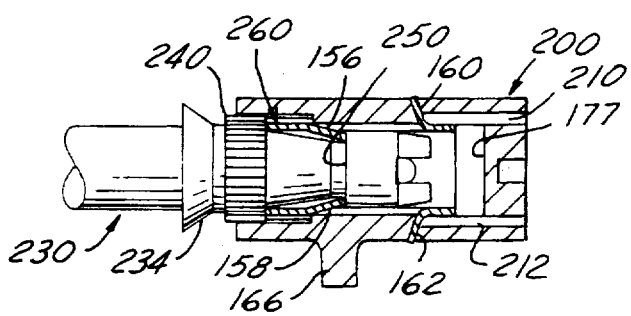
FIG. 17 illustrates the effects of an attempt to pull the cap off from the needle head after being fully secured thereon as in FIG. 16.

If after installation either of the caps are attempted to be removed by the end user, the effects of such tampering are illustrated by comparing FIGS. 16 and 17. As cap 200 is moved to the right as viewed in the figures, relative to needle 230, the free ends of the outer barbs 160 and 162 will abut the lock groove end walls 214 and 216 (FIG. 11). Due to their angular outward orientation the barb ends then will be forced through the wall material (e.g., if PP or Delrin) of the clip body, thereby further resisting cap removal. Thus, short of complete destruction of the cap the cap is effectively locked on the needle in permanent axial and rotational interengagement, the retaining clip, limiter cap and associated needle valve of the invention thereby being cooperable to render the same essentially tamper-proof.

Third Embodiment Needle and Cap with Second Embodiment Clip

Figure 19:
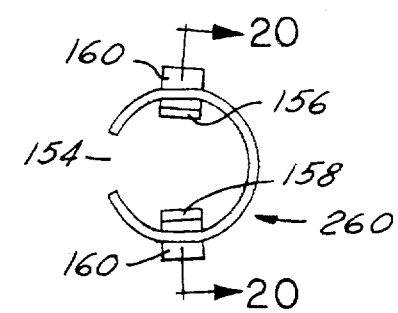
Figure 20:
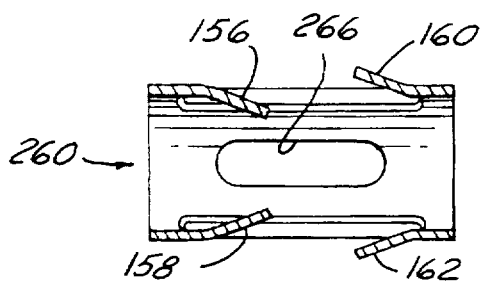
FIG. 20 is a cross-sectional view taken on the line 20—20 of FIG. 19.
Figure 21:
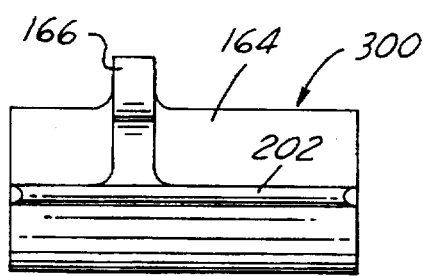
FIGS. 21 and 22 are side elevational and end views respectively of a third embodiment limiter cap of the invention intended for two-stage cap installation and needle adjustment with the clip of FIGS. 14–20 and needle valve of FIGS. 28–33.
Figure 22:
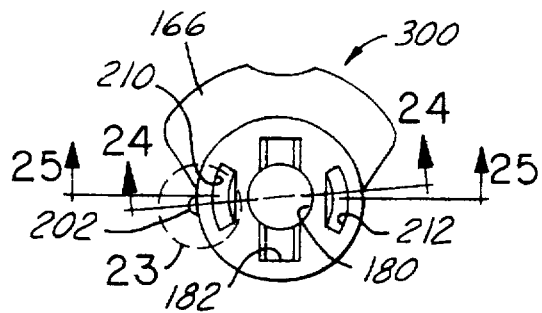
Figure 23:
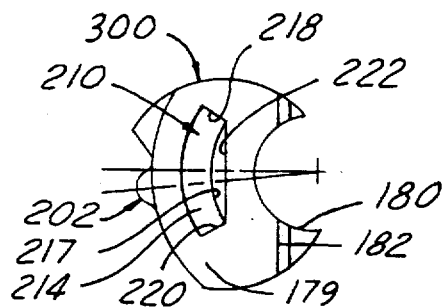
FIG. 23 is a fragmentary enlarged view of the portion of the cap encompassed by the broken line circle 23 in FIG. 22.
Figure 24:
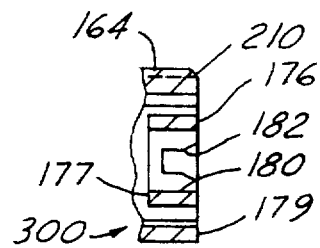
FIGS. 24, 25 and 26 are cross-sectional views respectively taken on the lines 24—24, 25—25 and 26—26 of FIG. 22, FIGS. 24 and 26 being fragmentary views.
Figure 25:
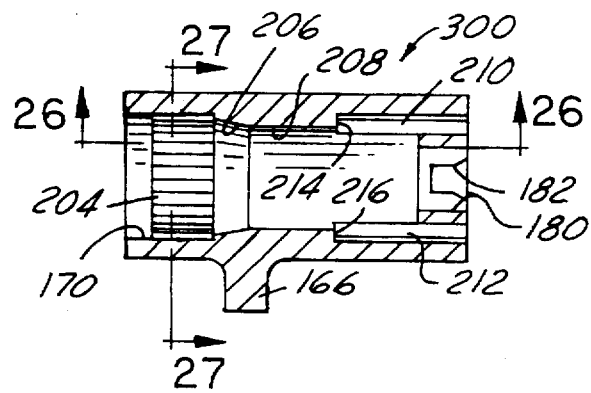
Figure 26:
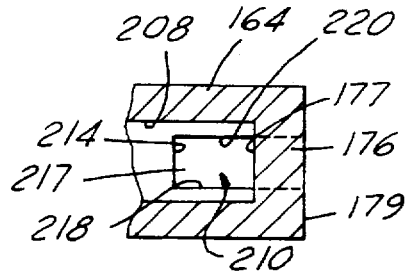
Figure 27:
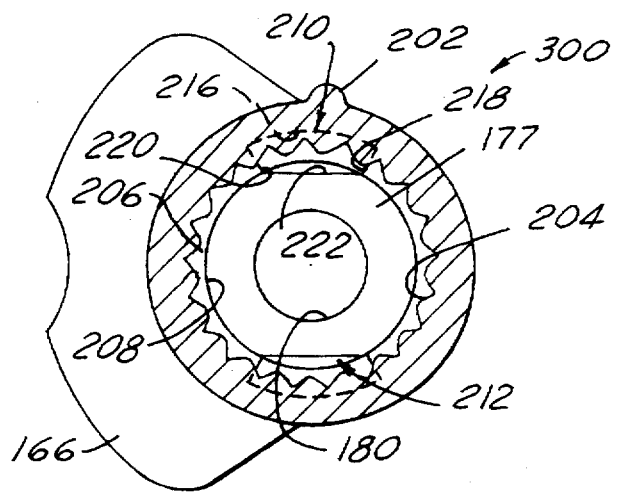
FIG. 27 is an enlarged cross-sectional view taken on the line 27—27 of FIG. 25.

Referring to FIGS. 18–33, a further modified third embodiment needle valve 320 shown in FIGS. 28–33 is used with the previously described third embodiment limiter cap 300 of FIGS. 21–27 in conjunction with the second embodiment clip 260 of FIGS. 18–20.

Needle 320 is preferably identical to needle 230 except for a modification to the outer end head segment of the needle. As best seen in FIG. 29, the portion of needle 320 from stop shoulder 250 to the free end of the needle is slightly axially elongated to provide a second barb acceptance groove 322 and associated barb stop shoulder 324 disposed axially between a shortened cylindrical portion 326 corresponding to surface 246 of needle 230. A secondary camming head is formed by a conical surface 328 leading aft of the needle from groove 322 to a second cylindrical surface 330 having the same diameter as surface 326.

As best seen in FIGS. 31 and 32, and in accordance with a further feature provided by this embodiment of the invention, the dual acceptance grooves 250 and 248 and respectively associated stop shoulders 324 and 250 are axially spaced relative to the spline segment 238 of the needle head, and also relative to the location axially in cap 300 of inner barbs 156, 158, internal splines 204 and clearance bore 170, to provide a two-stage cap-to-needle assembly procedure, with retaining clip 260 preassembled in cap 300.

The preassembly of clip 260 in cap 300 is accomplished in the same manner as described previously in conjunction with the second embodiment cap 200 and clip 260 to thereby provide the cap/clip subassembly 300/260 of FIGS. 29 and 30. With retainer clip 260 thus preassembled into limiter cap 300, the clip is retained by its two outward barbs 160, 162 which spring into the two slots 210 and 212 of the cap. Hence clip 260 will not spin within cap 300 nor pull out of the cap.

The first stage of the cap-to-needle installation is illustrated in FIGS. 29 and 31. Cap 300 is telescoped open-end-first onto the head of needle 320 with an easy, slip fit push motion. A slight resistance is felt as nose camming surface 243 engages inner spring barbs 156, 158, springing them apart as it passes them until the free ends of these barbs register with the first acceptance groove 324. At this point the inner barbs spring inwardly so that their free ends press on the surface of groove 322 behind the first stop shoulder 324 of the needle head. The installer will hear a "click" as this snap action occurs, and also feel the release of push-on resistance. Thus at the completion of this first stage, cap 300 is securely retained against pull off, and needle splines 240 are registered with the smooth entrance bore 170 so that the cap can spin freely on the needle. The needle valve 320 still remains accessible and independently directly rotatable for adjustment during engine run-in fine tuning by the OEM engine manufacturer because the needle blade slot 108 remains accessible within cap 300 via hole 180 in the cap end wall 176. Hence a carburetor equipped with two-stage needle 320, in conjunction with the cap/clip subassembly 300/260, offers the option to the carburetor manufacturer of pre-installing the limiter cap on the carburetor in the first stage condition of FIG. 31 so that the engine customer need not perform this task, or to supply to the O.E.M. customer an inventory of the cap/clip subassemblies to so install on the engine-mounted carburetor to this first stage condition.

The second stage of cap/clip needle valve installation is illustrated in FIGS. 31 and 32. This is performed after the fine tuning of the engine and appropriate positioning of associated limiter arms 166 and 168 of the side-by-side caps on the idle and main needles, as described previously. With the two caps typically oriented in the rich/rich adjustment position of needle valves 76, 78, and the two limiter caps likewise oriented rotationally relative to the associated needle valves, caps 300 are then pushed further onto the needles from the first stage position of FIG. 31 to the second stage position of FIG. 32. Again, if a slight resistance is felt as the needle splines 240 meet cap splines 204, a slight relative rotation therebetween is all that is needed to slip-fit mesh the two mating sets of spline teeth to continue the push-on slip-fit motion. During this motion, camming surface 328 of the trailing head segment will again spread apart inner barbs 156, 158 until their free ends travel past stop shoulder 250, whereupon the free ends of the barbs spring inwardly towards one another and seat in the second acceptance groove 248 with a snap action. Again, an audible click is heard and this condition felt by the installer, as augmented by the inner end 190 of the cap striking the conical surface of 234 of spring retainer flange 232, and/or the outer end face of the needle head abutting the inner end face 177 of the cap end wall 176. Thus, at the completion of the second stage of the installation procedure, cap 300 is securely locked against pull off on needle 320 by barbs 156, 158 engaging stop shoulders 250, and the needle and limiter cap are rotationally drivingly interengaged by their respective splines 204 and 240 to permit limited rotational adjustment of the needle valves within the range permitted by the limiter arms 166 and 168 for fuel flow adjustment by the end user of power tool 70.

As with cap 200, should an attempt be made to defeat limiter caps 300 by attempting to pull them off to disengage their splines, cap 300 will be further locked against removal by outer barbs 160 and 162 being forced through the plastic body wall of the cap 300, as illustrated in FIG. 33, but without thereby disengaging the needle and cap splines.

By way of description and not by way of limitation, in one working embodiment of the invention, the following dimensional perimeters are utilized, in conjunction with those previously set forth herein:

| Retaining clip 260: | |
| --- | --- |
| Overall axial length | 7.93 millimeters |
| Stock thickness | 0.254 millimeters |
| Inside free state diameter of the body | 3.83 millimeters |
| Inside diameter of clip barrel when compressed in cap 300 | 3.14 millimeters |
| Spacing of free ends barbs 156, 158 from right hand end of clip 260 as viewed in FIG. 20 | 4.73 millimeters |
| Radial dimension of free ends of barbs 160, 162 from outer periphery of clip barrel | 0.49 millimeters |
| Radial dimension of inward protrusion of free ends of barbs 156, 158 from inner periphery of clip barrel | 0.56 millimeters |
| Circumferential width of barbs 156–162 | 1.07 millimeters |
| Limiter Cap 300: | |
| Overall axial length | 12.6 millimeters |
| Axial dimension of entrance bore 170 | 1.00 millimeters |
| Axial dimension of splines 204 | 2.30 millimeters |
| Axial distance from splines 204 to end wall face 177 | 7.50 millimeters |
| Axial length of end wall 176 | 1.80 millimeters |
| Diameter of entrance bore 170 | 4.57 millimeters |
| I.D. of spline teeth 204 | 4.09 millimeters |
| O.D. of spline teeth 204 | 4.57 millimeters |
| Number of spline teeth 204 | 21 |
| I.D. of bore 208 | 3.80 millimeters |
| Axial spacing of shoulders 214, 216 from end wall face 177 | 2.90 millimeters |
| Diametrical spacing of root walls 217 of grooves 210 and 212 | 4.85 millimeters |
| Angle between side walls of grooves 2310 and 212 | 60 degrees |
| Radial distance of peak of rib 202 from cap centerline | 3.30 millimeters |
| Needle valve 320: | |
| Diameter of end surface 326 and surface 330 | 3.10 millimeters |
| Diameter of acceptance grooves 248 and 322 | 2.35 millimeters |
| Axial spacing of forward edge of splines 240 from needle head end face | 7.95 millimeters |
| Axial spacing of rear face of flange 232 from needle head end face | 11.50 millimeters |
| Axial spacing of shoulder 324 from needle head end face | 2.30 millimeters |
| Axial dimension of groove 322 | 0.50 millimeters |
| Axial spacing of shoulder 250 from needle head end face | 4.40 millimeters |
| Axial dimension of splines 240 | 1.75 millimeters |

Fourth Embodiment Needle Valve and Retainer Clip with First Embodiment Cap

FIG. 34 illustrates a fourth embodiment needle valve 400 and an associated fourth embodiment retainer clip 402 useable with the previously described first embodiment limiter cap 152 to thereby provide a single-stage type limiter cap installation on the needle valve, also in accordance with the present invention. Needle valve 400 is similar to needle valve 120 except that the head of needle valve is modified to provide a cylindrical shank 406 of reduced diameter extending between spline segment 124 and head segment 122. Retainer clip 402 is constructed in a manner similar to clip 150 except that inner barbs 156 and 158 are eliminated and a pair of generally diametrically opposite outer barbs 408 and 410 are provided in place of outer barbs 160 and 162, generally located as indicated in FIG. 34. As in the first embodiment, retainer clip 402 is preassembled to needle 400 by slipping clip 402 telescopically over the needle head 122 thereby springing the clip further open until it fully registers with shank 406, whereupon it contracts to its free state condition so as to encircle the shank, and is axially captured thereon between head stop shoulder 140 and the inner end face 186 of the flute segment 124.

In use, cap 152 is so assembled on needle 400 (with clip 402 pre-assembled on the needle) after OEM engine fine tune adjustment of the needle valves has been completed. Typically when the needle valves have been adjusted to the rich/rich maximum permissible setting, a pair of the caps 152 are individually installed on a pair of needle valves 400 in side-by-side relation. If not already pre-oriented by peanut clip 930 as described hereinafter, the orientor arms 166 and 168 are rotated into the mutual stop position as described previously. Then the caps are installed open end first over the heads of the needles until they abut the spring stop flange 112 of the needles. Once so installed, the free ends of the spring barbs 408, 410 will dig into the internal splines of the cap. If the cap is attempted to be pulled off, clip 400 is restrained against pull off movement by being captured on the needle head, causing the free ends of barbs 408 and 410 to further dig into the internal splines of the cap to prevent removal of the same. Hence the appliance tool 70 is protected against improper carburetor needle valve adjustment of fuel flow by the end user.

Fifth Embodiment Needle Valve and Retainer Clips with Third Embodiment Limiter Cap FIGS. 35 and 36 semi-diagrammatically illustrates a fifth embodiment needle valve 500 and associated fifth embodiment retainer clip 502, with clip 502 preassembled in the third embodiment limiter cap 300 described previously. Needle valve 500 has a head segment 122 similar to that of needle valve 120, an axially shortened external spline segment 238 like needle 230 and an elongated, reduced diameter cylindrical shank 504 integrally interconnecting head segment 122 with the main shank 100 of the needle valve. Retainer clip 502 is made in a manner similar to clip 150 with the outer spring barbs 160 and 162 and parting gap 154. However, inner barbs 156 and 158 of clip 150 are replaced by one modified inner barb 158'. The free end of barb 158' axially overlaps the free end of outer barb 162 as diagrammatically shown in FIG. 35. Therefore, although not shown, it is to be understood that barb 158' is circumferentially staggered relative to barb 162 in the barrel of the clip tube to permit progressive die formation of the same in its axially overlapped relationship with barb 162. Clip 502 also has a slightly inwardly struck inner end tang 506, which curves inwardly from its integral junction with the tubular wall of the clip to a free end position slightly radially inwardly of the wall (FIG. 35).

In use of needle 500 and clip 502, clip 502 is first preassembled into cap 300 in the same manner as clip 260 of the cap 300 as described previously. This will nonrotatably lock clip 260 and cap 300 together due to outer barbs 160 and 162 springing into cap grooves 210 and 212, and will axially lock the clip between the inner face 177 of the cap end wall and the groove stop shoulders 214 and 216. The cap/clip subassembly 300/502 is then installed on needle 500 in a two-stage installation procedure, similar to that employed with needle 320 and cap 300 as previously described in conjunction with FIGS. 29–33. Note that in the first stage of installation, which is that shown in FIG. 35, bevel 130 of head segment 122 when it encounters tang 506 will cam the same outwardly to allow the head to move therepast. Once the needle head stop shoulder 140 moves past tang 506 the same will snap radially inwardly against the surface of head shank 504, thereby causing an audible click due to the spring force of tang 506 producing a snap action. In addition, the bend line junction of tang 158' with the tubular barrel of sleeve of clip 502 is located axially such that it provides a slight resistance to further installation motion of cap 300 on needle 500, thereby tending to releasably hold cap 300 from further insertion past the first stage installation position of FIG. 35. In this position, cap 300 can spin freely on needle 500 since the external splines of spline segment 238 have only entered the clearance bore 170 of the cap.

In the second stage of the installation (not shown), cap 300 is further pushed onto the needle valve until cap inner end 190 abuts spring retaining flange 112 of the needle valve. In this fully installed condition, the needle valve splines and cap splines are slip-fit meshed to permit only conjoint rotation of the cap and needle valve. Removal of the cap from this position is prevented by the free end of tang 158' abutting head stop shoulder 140 (not shown). Again, when the stop shoulder 140 of head segment 122 travels past the free end of tang 158' an audible snap action click will be produced to signify the cap is fully locked up with the needle.

Sixth Embodiment Needle and Six Embodiment Clip With Third Embodiment Cap

FIGS. 37 and 38 illustrates a sixth embodiment needle valve 600 and sixth embodiment retainer clip 602 associated with cap 300. The only difference between needle 600 and needle 500 is the provision of the modified shank 504' joining the main shank 100 at a diverging conical taper portion 602, instead of the radius junction of shank 504 with shank 100 seen in FIG. 35. Clip 602 differs from clip 502 in having the inwardly bent end tang 506' bent into a slightly conical formation to mate with the conical shank shoulder 602 in the fully installed position of cap 300 on needle 600. Clip 602 also differs from clip 502 in having a reversely oriented barb or bump 606 formed on barb 158' to further resist push-on travel of cap 300 past the first stage position of FIG. 37. However when cap 300 is pushed from first stage to second stage, needle head segment 122 will cam over bump 606 and deflect arm 158' outwardly out of the path of travel of head 122.

The use and operation of needle 600 and clip 602 with cap 300 is the same as that of needle 500 and clip 502 as described previously.

Seventh Embodiment Needle with Second Embodiment Retainer Clip and Third Embodiment Cap FIG. 39 illustrates a seventh embodiment needle 700 usable with retainer clip 260 and cap 300 as described previously in conjunction with needle valve 320 and with reference to FIGS. 29–33. The only difference between needle 700 and needle 320 is that the conical portion 252 is replaced by a uniform diameter cylindrical shank 702 which joins the main needle shank 100 at a radius shoulder junction. The use and operation of cap 300, with clip 260 preinstalled therein, in its installation on needle 700 is the same as that described in conjunction with needle 320 described previously in conjunction with FIGS. 29–33.

It is to be understood that the diameter of the needle shank 702 may be further reduced to a certain extent to accommodate different thicknesses and configurations of the inner spring barbs.

Eighth Embodiment Needle and Seventh Embodiment Clip and Cap

Referring to FIGS. 40 and 41, an eighth embodiment needle valve 800 is illustrated for use in conjunction with a seventh embodiment needle clip 802 and seventh embodiment limiter cap 804 to provide another form of a two-stage push on limiter cap of the invention. Needle 800 is similar to needle 400 in having a reduced diameter cylindrical clip-mounting shank 806 extending aft from the needle head 122. However, an extension 808 of main shank 100 is disposed between shank 806 and the external spline segment 124 of the needle. A stop shoulder 810 is thus formed at the junction of shank 806 and shaft extension 808 for axially retaining spring clip 802 therebetween. Clip 802 is again a progressive die stamping formed similar to the previously described retainer clips, having a parting gap 154 (not shown) and being resiliently expandable from its free state condition to slip over the head of 122 of the needle and then released to be captured on shank 806 between shoulder stops 140 and 810. Clip 802 has a outer barb 812 struck outwardly with its free end protruding flush with the inner end of clip 802. Another longer spring leg 814 is struck from the barrel of clip 802, generally diametrically opposite leg 812, and having a slightly further bent portion or foot 816 formed at its free end. Clip 802 also has an outwardly protruding key tab 818 extending perpendicularly to the clip axis.

Cap 804 is formed with a main cylindrical bore 820 which extends from the inner face 177 of the cap end wall to a junction with an internal splines 204 of the cap. A stop lug 822 protrudes inwardly from the wall of the cap and is chamfered at 824 facing the open end of the cap. A clip locking groove 826 extends axially of the cap from the closed end to a stop face 828 formed at the junction of groove 826 and lug 822. Cap 804 has another internal groove 830 generally diametrically opposite groove 826, likewise opening to bore 820 and running from its groove end face 832 all the way through the internal splines 204 and opening at the open end 190 of cap 820. A through hole 834 is formed in the wall of cap 804 and registers with groove 830 at a location correlated with clip 802 for registration with tab finger 816 in the fully installed position of the cap on the needle.

In operation and use of needle 800, retainer clip 802 and cap 804, clip 802 is preassembled to needle 800 by resiliently expanding the same to slip axially over and past needle head 122 and then snap into loose encircling relation with shank 806 for capture between shoulder faces 140 and 810 as shown in FIG. 40. Then, with clip 802 and needle valve 800 so preassembled, cap 804 may be telescoped open-end-first over needle head segment 122 by first angularly aligning key tab 818 with keyway 830 before pressing the cap on to permit tab 818 to be inserted into the open end of key way 830. This orientation also thereby angularly aligns tab 812 with locking slot 826. Cap 804 is then pushed onto the needle. Key tab 818 will ride in slot 830 and pass by hole 834, and when tab 816 registers with hole 834, it springs lightly into the hole (not shown). The inclination of the diametrically opposite barb 812, as it strikes and rides along the end surface 190 of cap 804, also develops a side or lateral clip shifting force tending to force key tab 816 into hole 834 as the tab reaches registry with the hole. Once tab 816 digs into hole 834, cap 804 and needle 800 can not be axially separated from one another.

The completion of this first stage of slip on installation occurs at a position between those shown in FIGS. 40 and 41, wherein cap 804 is releasably axially locked against further push-on assembly, and non-releasably locked against pull-off from needle 800, by tab 816 registering with hole 834. In this condition, cap 804 and clip 802 are also locked for rotation as a unit, but clip 802 can still spin freely on needle 800. As previously described, the paired orientation of limiter arms 166 and 168 of an associated cap 804 may likewise be accomplished with this eighth embodiment construction.

After completion of fine tuning of the carburetor on an engine running on the engine manufacturer's test stand, and the idle and main needles preferably thus set to their maximum permissible rich/rich setting, limiter cap 804 then ready to be pushed from the first stage to the second stage, fully locked-on condition of FIG. 41. To release cap 804 from the first stage yieldable retention on needle 800 cap is pushed further onto the needle to thereby cam barb 814 into the clip barrel and thus withdraw T-tab 816 from hole 834 while cap 804 is simultaneously being pushed further onto the needle. As the cap and needle move together relative to one another from the position of FIG. 40 to that of FIG. 41 upper barb finger 812 is cammed inwardly as it slides under lug 822, and lower tab 814 is likewise cammed inwardly as its free end 816 slides in the track of groove 830. When the free end of upper tab 812 clear stop shoulder 828 of lug 822, tab barb 812 will be aligned by tab 814 slidably seating in lock groove 830 so barb 812 registers with and springs out to seat its free end in the upper lock groove 826. Cap 804 is then fully locked onto needle 800 by the abutment of the inner face 177 with needle head 122 and the axially opposed abutment of shoulder 828 with the end of barb 812, the cap and needle thus being rotationally drivingly and bi-directionally intercoupled.

Needle 800, retaining clip 802 and cap 804 thus may be installed and used singely or in pairs, and with side-by-side limiter arm post-assembly orientation in accordance with the orientation feature of the aforementioned '645 patent, and also with pre-assembly peanut clip orientation as set forth in the embodiment of the invention as disclosed and described hereinafter in conjunction with FIGS. 54–62.

First Embodiment Anti-Tamper Flap Limiter Cap Used With Needle Valves of '634 and '645 Patents FIGS. 42–45 illustrate an anti-tamper flap embodiment of the present invention suitable for use in both prior two-stage open-ended limiter caps constructed for needle valves as disclosed and claimed in the '634 and '645 patents and for the open-ended two stage limiter caps with interior retaining clips of the present invention. In the embodiment illustrated in FIGS. 42–45, the '634 patent needle valve 850 has a spring retainer flange 112, external spline segment 124, reduced diameter shank 126, needle head segment 122 with a chamfer end face 123, and an associated external annular rib 125 formed at the junction of reduced diameter shank 126 and head 122.

As in the '634 patent, the associated limiter cap 852 of this exemplary embodiment is made of semi-resilient plastic material, such as Delrin 500 or polypropylene (PP), as an injection molded part with the tubular body 164 open at end 190 and having an entrance chamfer 191, and a smooth walled main bore 854 extending from the open end of the cap to end wall 176 having the access opening 180 and cap driver tool slot 182 therein. Needle head rib 125 is releasably engaged in an internal groove 856 one cap 852 when installed to its first stage position on needle 850 as shown in FIGS. 42 and 44.

In accordance with the anti-tamper flap feature of this invention, cap 852 is provided with releasable closure means 860 for cap access opening 180 to permit adjustment tool access to needle 850 with cap 852 installed in the first stage of FIGS. 42 and 44. Closure means 860 is opened by inserting therethrough a suitable adjustment tool blade 856 via end wall opening 180 as shown in FIG. 44. In the embodiment illustrated in FIGS. 42–45, the releasable closure means is in the form of a segmented disc flap 860 subdivided into four pie-shaped 90° resiliently yieldable section segment fingers 862, 864, 866 and 868 (FIG. 43) generally co-planar when closed and meeting at their mating edges to form the two diametrically extending, mutually perpendicular cross slip 870 and 872 (FIG. 43). This closed condition of flap 860 as shown in FIGS. 42, 43 and 45 is the free state condition of flap segments 862–868, to which they tend to return due to the memory of the plastic material of limiter cap 852. Preferably the segment fingers are of tapering thickness, narrowing towards their meeting slit lines 870 and 872 and being thickest at their integral "living hinge" junction with cap end wall 176 and adjacent body wall 164.

In operation and use of cap 852 after it has been assembled to its first stage position shown in FIG. 42 (wherein cap 852 is releasably retained on needle 850 against movement axially relative thereto but is free to spin thereon), engine fuel flow fine tuning can be achieved by inserting the working end of needle adjustment tool 856 through cap access opening 180 to engage driver slot 108 of needle 850 for rotational adjustment of the same, as shown in FIG. 44. The segment fingers 862–868 of flap 860 readily yield and flex to swing inwardly apart in response to the force of tool insertion therethrough, and likewise do not interfere with rotation of tool 856. When tool 856 is retracted and removed from cap 852 the flap finger segments, due to the resilience and memory, return to their closed condition of FIGS. 42 and 43.

When cap 852 is fully inserted onto needle 850 by moving it from the first stage position of FIG. 44 to the second stage position of FIG. 45, this installation motion drives the end face of the head segment 122 against the inner surfaces of the flap fingers 862–868 whereupon the needle head serves as a back-up reinforcement to maintain the fingers flat and closed together. As set forth in the aforementioned '634 patent, cap 852 is so maintained on needle 850 for conjoint rotation therewith by the interference fit of the spline segment 124 into cap bore 854, the resilient material of cap 852 yielding to permit this interference and causing the yieldable embedment of rib 125 of the needle head in the bore wall internal groove 856 of cap 852.

With the needle and cap in the fully locked position of FIG. 45, needle rotation adjustment can be performed only by engaging the working end of an adjustment tool blade into the cross slot 180 of the head end cap 852. Therefore needle rotation is limited to the range permitted by the stop positions of limiter arms 166 and 168 as described previously. However, should the end user or others attempt to defeat this tamper-proof flap feature in field use of a power tool 70, as by attempting to insert the blade of an adjustment tool 856 via cap opening 180 into needle head slot 108, flap 860 will defeat such an attempt by serving as a barrier preventing operable access of the tool for direct needle rotation independently of the restraint of cap 852. Even if flap fingers 862–868 are forced or mashed at their free ends into needle slot 108 by manipulating the blade of a screw driver or the like, the relatively soft and pliable plastic material of the fingers will then tend to fill the slot with such material. So "gumming up" slot 108 will then render it inoperable for proper driving engagement with the screw driver blade so that rotational torque either can not be applied to needle 50, or will be of insufficient magnitude to overcome the rotational restraint of the interengagement of cap barrel with fluted needle segment 124. Moreover, the closed flap disc 860 will tend to deter such improper needle valve adjustment attempts by forming a complete closure hiding the existence of the needle adjustment slot 108 from the appliance end user.

Second Embodiment Anti-Tamper Flap Limiter Cap

FIGS. 46–51 illustrate the construction and sequential operation of a second embodiment anti-tamper flap limiter cap 900 assembled and used with the previously described retainer clip 502 and associated needle valve 500 described in conjunction with FIG. 35. Hence cap 900 and retainer clip 502 preassembled therein are usable and operational in the two stage installation method described in conjunction with FIG. 35, and in more detail with reference to the embodiment of FIGS. 29–33.

Figures 46, 47:
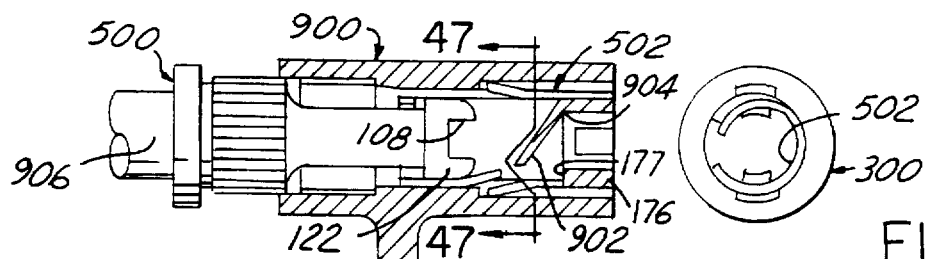
FIGS. 46 and 48–51 are part side elevation, part center sectional views of a two-stage-type, second embodiment anti-tamper flap limiter cap of the invention utilizing the fifth embodiment retainer clip and needle valve, and illustrate in sequence a preadjustment first stage of assembly of the cap on the needle valve (FIG. 46), a square bit adjustment tool inserted into the cap, past the flap, and engaged at its end with the driver slot of the needle valve (FIG. 48), the adjustment tool being removed from the cap (FIG. 49), the anti-tamper flap returned to its original free state position after removal of the tool (FIG. 50), and the cap and clip fully installed and locked for unitary rotation on and with the needle valve (FIG. 51), with the anti-tamper flap likewise locked closed.
FIG. 47 is an end elevational view of the cap and clip of FIG. 46.
Figure 48:
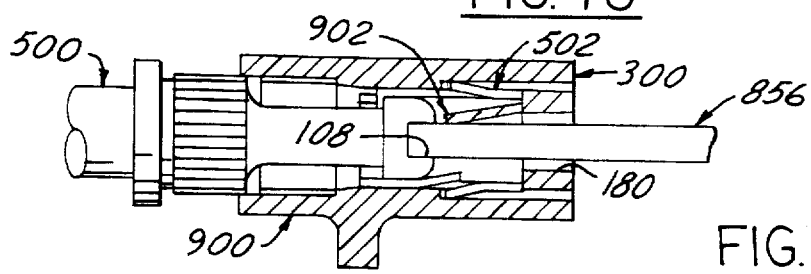

The anti-tamper flap 902 of cap 900 is a one-piece member of generally uniform thickness and of circular outline in plan view complimentary to the associated internal diameter of clip 502 at is outer end. Flap 902 is formed during injection molding of the cap of the same plastic material as the cap (e.g., PP or Delrin 500) and is integrally joined at a "living hinge" portion to a chordal segment of the inner surface 177 of end wall 176 of cap 900. (FIG. 46). In the free state normal condition of repose of flap 902, it may either lie flat against surface 177 or be inclined inwardly of the cap therefrom to an angulation of approximately 40° to the longitudinal center axis 906, as shown in FIGS. 46 and 50, when not engaged by needle 500 or an adjustment tool 856.

Figure 49:
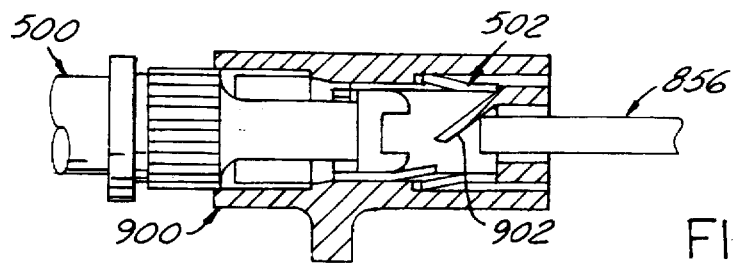
Figure 50:
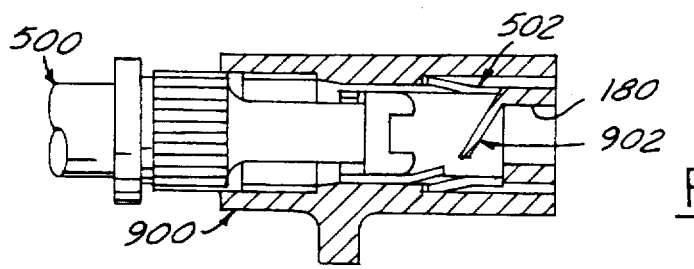

The operation and use of anti-tamper flap 902 in the first stage of cap/clip installation on needle 500 is illustrated sequentially in FIGS. 46–50. It will be seen that with the cap in the first stage installation position of FIG. 46, flap 902 hangs as a yieldable barrier between cap access opening 180 and needles slot 108. When it is desired to fine tune the engine while running on the final engine test stand of the OEM engine manufacture, the square section adjustment tool 856 is inserted blade end first through cap access opening 180 so as to swing and bend flap 902 upwardly out of the way of tool passage. Hence the working end of tool 856 can be easily inserted into needle slot 108 for rotational adjustment of needle 500 for fine tuning of the engine as described previously. Due to its flexible nature and living hinge 904, flap 902 readily swings to yield to such tool insertion, and also may bend readily into conforming cross curvature as it engages the encompassing wall of clip 502. When needle 500 has been rotated to its proper fuel flow setting adjustment tool 856 is retracted as shown in FIG. 49 and removed from the cap as shown in FIG. 50. This allows flap 902 to return to its normal free state repose position of FIG. 50.

Figure 51:
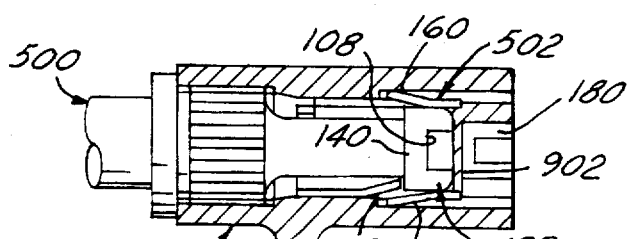

When cap 900 is moved from its first stage to its position (FIG. 50) to its fully locked up second stage position (FIG. 51) the head segment 122 of needle 500 will engage the inside face of flap 902 and force it to its fully closed position of FIG. 51. In this condition, needle head segment 122 is held against the inner backside face of flap 902 due to clip barb 158' engaging needle head shoulder 140 and by the associated cooperative engagement of the outer clip barbs 160 and 162 with cap key slot shoulders 214 and 216, as described previously. It will be seen that flap 902 is preferably suitably dimensioned in plan outline contour to overlap the margin of wall 176 at the inner end of cap access opening 180 in this fully closed, needle-locked condition. Hence neither adjustment tool 856 nor other types of blades of common hand tools can be used to improperly gain access to the needle adjustment slot 108 in the final locked position of cap 900 on needle 500 (FIG. 51). Preferably the cross sectional thickness of flap 902 is made to a minimum dimension of about 0.3 mm in order to insure adequate resistance to improper tampering. Again, even if an attempt is made to improperly force flap 902 with a tool blade into needle slot 108, the barrier initially provided by flap 902 and then the material of the flap forced into slot 108 will prevent sufficient tool blade engagement with needle slot 108 to enable sufficient torque to be exerted on the needle to overcome the rotational lock-up resistance of limiter cap 900.

Third Embodiment Anti-Tamper Flap Limiter Cap

Figures 52, 53:
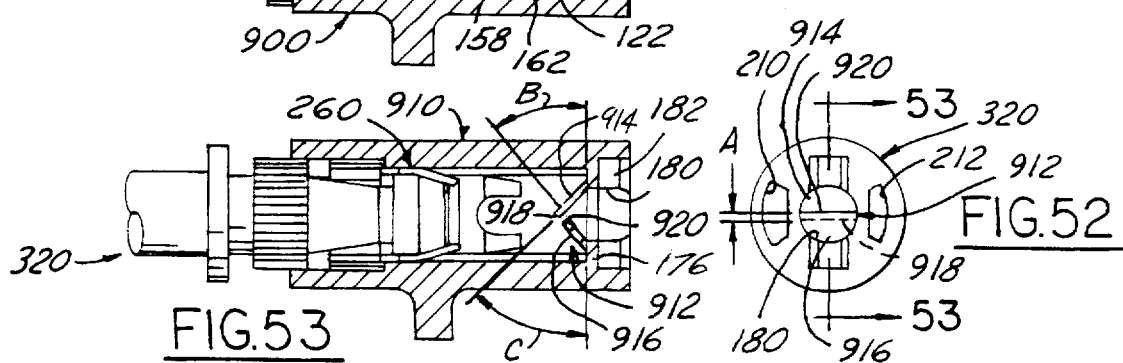
FIG. 52 is a end elevational view of the outer end of a two-stage-type, third embodiment anti-tamper flap limiter cap of the invention shown in FIG. 53.
FIG. 53 is a cross-sectional view taken on the line 53—53 of FIG. 52 illustrating the cap assembled to a first stage of assembly on a third embodiment needle valve, and with a second embodiment retaining clip installed in the cap.

FIGS. 52 and 53 illustrate in somewhat simplified form a third embodiment anti-tamper flap limiter cap 910 also in accordance with the present invention. Cap 910 is constructed identically to the previously described limiter cap 300 except for the addition of a further modified form of an anti-tamper flap 912. Cap 910 is shown for use, by way of example, with the previously described needle valve 320 and associated previously described retainer clip 260, but with the outer clip barbs and associated cap lock grooves not shown in FIG. 53 for simplicity. Flap 912 is constructed during injection molding of plastic cap 910 as a two-part flap with an upper semi-circular flap leaf 914 and a lower flap leaf 916, each of generally semi-circular outline in plan view, and integrally joined at their upper and lower edges by chordal hinge sections to the cap end wall 176 at the inner margin of cap access opening 180. Preferably, as shown in FIG. 52 flap leaves 914, 916 are designed such that in their closed condition shown in FIG. 52 their diametrically extending free end edges 918 and 920 respectively slightly overlap. Alternatively, these free end edges may be designed to first meet in the closed condition of the flap leaves.

As shown in FIG. 53, upper flap leaf 914 is preferably molded to have a free state angulation of included angle C of 45° between the plane of the flap and the inner face of the cap end wall 176, and lower flap leaf 916 may be molded to have a free state included angle B of 35° between its major plane and the cap end wall.

In operation and use, the dual leaf flap 912 operates similar to the segmented flap leaf 860 of the previously described cap 852 (FIGS. 42-45) for to readily permit adjusting needle 320 on the OEM engine test stand in the first stage of installation of cap 910, i.e., by inserting a blade of a screw driver type adjustment tool through the leaves of flap 912. After such adjustment is made and the tool withdrawn from the cap, the cap is then pushed to final second stage, fully locked condition. Due to the previously described interengagement of the cap, clip and needle valve, the outer head end face of needle 320 will abut the inner surfaces of the flap leaves 914 and 916 to hold them closed across the cap access opening 180 to render the limiter cap tamper-proof similar to the manner of flaps 860 and 902.

Paired Limiter Caps and Peanut Clip Embodiments

FIGS. 54-76 illustrate various embodiments of another principal feature of the invention, namely a so-called "peanut clip" orienting means that is provided for augmenting as well as improving upon the orienting means feature of the aforementioned '645 patent described previously with reference to FIGS. 25 and 25A of the '645 patent.

First Embodiment Cap Orientation Peanut Clip

Figures 54, 55:
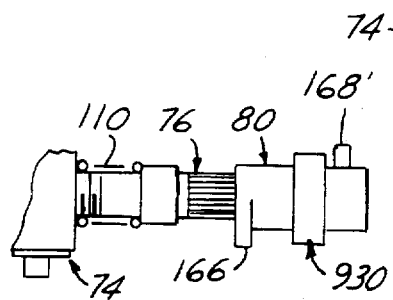
FIG. 54 is a fragmentary side elevational view of the carburetor of FIGS. 1–3 having a first embodiment of an orientor peanut clip of the invention assembled in combination with a pair of needle-valve-installed limiter caps constructed internally as disclosed and claimed in the aforementioned '634 and '645 patents but having the limiter arm 168' of cap 82' moved outwardly into a peanut clip flanking position.
FIGS. 55 and 56 are fragmentary side elevational views of the right and left hand sides respectively (as viewed in FIG. 54) of the peanut clip, cap needle and carburetor assembly of FIG. 54.
Figure 56:
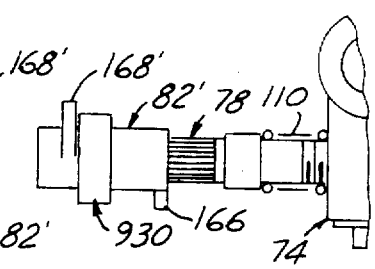

As illustrated in FIGS. 54-56 the first embodiment of the peanut clip 930 is shown orienting a pair of limiter caps 80 and 82' mounted side by side in the first stage installation position on their associated low and high speed needle valves 76 and 78 as installed on carburetor 74. Limiter caps 80 and 82' may be constructed as disclosed and claimed in the aforementioned '645 patent, for example the embodiment illustrated in FIG. 24 thereof. In such use of clip 930, both of the limiter arms 166 and 168 are disposed axially between the clip and the needle-receiving ends of caps 80 and 82. Alternatively, however, as illustrated in FIGS. 54–56, the high speed cap 82' may be modified to move the limiter arm 168' axially toward the outboard end of cap 82' so that arms 166 and 168' axially flank and capture clip 930 therebetween in accordance with a further feature of the present invention.

Figure 59:
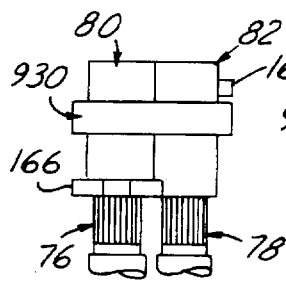
FIG. 59 is a bottom plan view of the orientor peanut clip, cap and needle assembly of FIG. 54.
Figure 60:
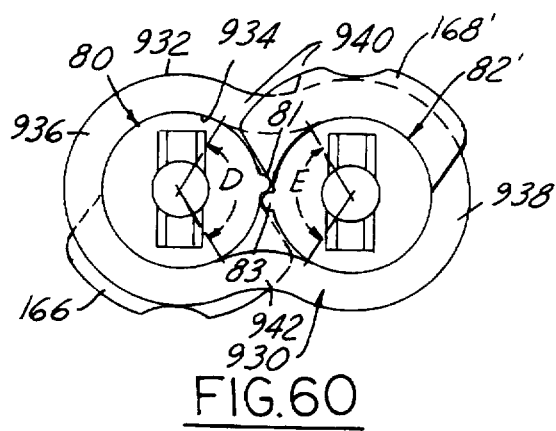
FIG. 60 is an enlarged end elevational view of the orientor peanut clip and limiter caps of FIG. 54.

In the exemplary embodiment of FIGS. 54–60 caps 80 and 82' are provided with the axially extending, radially outwardly protruding orientor ribs 81 and 83 best seen in the enlarged view of FIG. 60. Ribs 81, 83 cooperate in the manner of ribs 118 and 120 as disclosed and claimed in conjunction with FIGS. 25 and 25A of the aforementioned '645 patent, and hence will not be further described herein.

In accordance with further features of the present invention, the paired needle limiter caps 80 and 82' are pre-packaged in a pre-set "rich/rich" orientation by pre-assembly with peanut clip 930 in orientor cooperation with the orientor ribs 81 and 83 in the embodiment of FIGS. 54–60. Peanut clip 930 in this embodiment is preferably made as an injection molded plastic part, made for example of polypropylene (PP) or Delrin 500, as a dual-lobe ring so as to have, as seen in the end elevation views of FIGS. 54 and 60, at its outer peripheral surface 932 a peanut-shaped outer contour. Clip 930 preferably has a uniform cross sectional thickness in the plane of the drawing so that the contour of its inner peripheral surface 934 matches that of the outer surface, and hence is likewise peanut-shaped. As shown in FIGS. 55, 56 and 57-59 clip 930 is of uniform width axially of the limiter caps. The peanut shape of clip 930 thus provides in end view a lobe 936 at one of the clip and a like lobe 938 at the opposite end of the clip. Lobes 936 and 938 are integrally joined by the reversely curved nip portions 940 and 942 of the clip.

In the embodiment of FIGS. 54-60 the inside diameter of each of lobes 936 and 938, as defined by the associated inner periphery 934 thereof, is preferably dimensioned to individually receive the cylindrical outer periphery of the associated caps 80 and 82' telescopically therethrough with a close slip fit. Preferably the inner peripheral surface 934 of each lobe 936, 938 extends through an angle about the cap axis of about 260°, and hence the included complimentary angles D and E as shown in FIGS. 60 are about 100° where lobes 936 and 938 integrally join nip portions 940 and 942, i.e., where the inner peripheral surface 934 of the clip tangently diverges away from engagement with the outer periphery of the caps.

Figure 3:
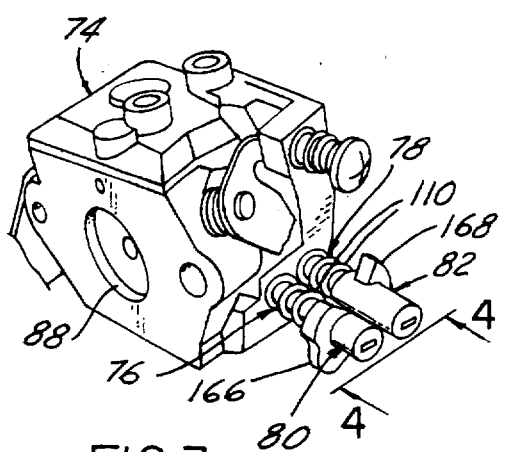
FIG. 3 is a perspective view of the carburetor of FIG. 2 illustrating caps of this invention mounted on both the main and idle needle valves.
Figure 4:
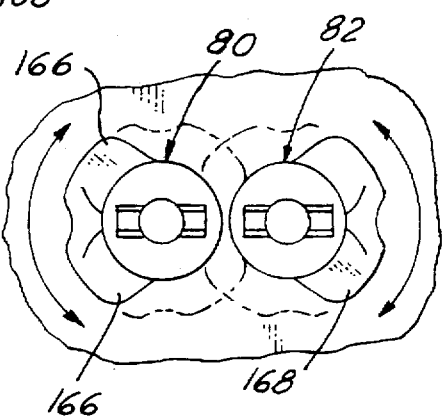
FIG. 4 is a fragmentary view looking in the direction indicated by the line 4—4 of FIG. 3 and diagrammatically illustrating user adjustment range of the needle valves with limiter caps locked thereon.

With clip 930 constructed as described above, caps 80 and 82' having limiter arms 166 and 168 located as shown in FIGS. 2-4 may be preassembled in the clip by inserting both caps in the same direction endwise respectively into lobes 936 and 938 of clip 930 while angularly oriented in rich/rich orientation, i.e., with their associated limiter arms 166 and 168 rotated so as to be mutually abutted to the opposed cap cylindrical outer surface as shown in FIGS. 54 and 60, and with the orienting ribs 81 and 83 of the caps likewise yieldably locked in side-by-side abutment, as best seen in FIG. 60. When using the widely axially spaced clip-flanking orientation feature of limiter arms 166 and 168' of the present invention, the caps 80 and 82' are telescoped into clip 930 in axially opposite directions during this preassembly procedure, with the limiter arms at the cap trailing ends, until the end faces of the cap are flush as shown in FIG. 59.

Clip 930 is dimensioned and constructed such that its lobes 936 and 938 respectively provide a light frictional grip on the associated caps 80 and 82' so as to maintain the caps preassembled and properly installation oriented angularly in the clip and with their longitudinal axes parallel. With the two caps 80 and 82' and clip 930 so preassembled, clip 930 is held captured in this prepackaged subassembly axially between limiter arms 166 and 168'. Hence this clipped-together set of limiter caps intended for the idle and main needle valves 76 and 78 respectively may be conveniently packaged and securely handled and shipped to the OEM engine manufacture for storage and then assembly as a pre-oriented unit onto the side-by-side engine-installed needle valves 76 and 78.

Caps 80 and 82' thus may be preoriented to facilitate installation using the two-stage procedure in accordance with the '645 patent if desired. After the OEM engine test stand fine tuning of the needle valves to their maximum permissible rich/rich fuel flow setting, the subassembly of the two caps 80 and 82 and clip 930 are pushed to the final, second stage fully locked position. Then, in the field, the end user can only tune the engine within the range from maximum rich to maximum lean settings permitted by cap limiter arms 166 and 168'.

In order for the end user to unlock caps 80 and 82' rotationally from the setting shown in FIG. 60, as by using a screw driver blade engaged with cap slots 182, cap 80 is rotated clockwise as viewed in FIG. 60, and/or cap 82' is rotated clockwise from the FIG. 60 setting. The first increment of this cap rotation will cause ribs 81 and 83 to yield and ride over one another to thereby unlock the caps from their preset condition. Preferably ribs 81 and 83 are made small enough in their radially protruding dimension so that typical needle play of a few thousandths of an inch will allow lateral spread of the needle outer ends that will accommodate mutual override yield of ribs 81 and 83 during such initial unlocking rotation of the caps. Alternatively or additionally, if the caps are made of soft enough plastic material, the ribs (and caps) themselves may also yield to accommodate this unlocking override.

During this initial unlocking rib-override procedure the center-to-center distance of lobes 936 and 938 of clip 930 will likewise be increased. Such lateral elongation of clip 930 will be accommodated by the clip lengthening provided by the reverse curvature of nip portions 940 and 942. That is, due to the flexibility of the material of clip 930, nip portions 940 and 942 can straighten out in response to lobe spreading forces to thereby accommodate the center-to-center spread apart of the clip lobes caused by rib override. Hence the material of clip 930 need have only flexibility and minimum or no elasticity to accommodate the unlocking of ribs 81 and 83, an important advantage over prior art usages of orientor rings in the form of ordinary elastic rubber bands or commercially available elastic O-ring seals that were stretched into an oval retaining contour over the side by side limiter caps. Thus, clip 930 with its molded free-state peanut shape can be made either of semi-resilient material such as polypropylene and Delrin or of hard but slightly flexible metallic or thermosetting plastic materials, and hence of materials much more compatible with the end use environment. When so made, clip 930 is not subject to the deterioration and cracking previously experienced with the unsatisfactory prior art stretched elastic bands, as typically caused by exposure to ambient ozone and/or other deleterious substances normally encountered in field use of the engine on power tool 70.

Moreover, since each of the limiter caps is individually clasped by its associated lobe 936, 938 of clip 930, clip 930 can be premolded to any desired center-to-center distance spacing of the lobes to likewise accommodate variations in center-to-center spacing of the limiter caps and associated needle valves. Clip 930 also will thus maintain caps so spaced with their axis parallel and at the desired cap spacing, both as a preassembled unit prior to installation on the needle valves as well as thereafter in engine use.

Second Embodiment Cap Orientation Peanut Clip

Figure 61:
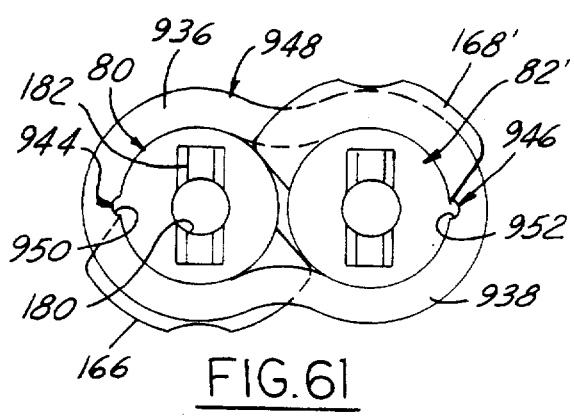
FIG. 61 is an end elevational view of a second embodiment orientor peanut clip as installed on a cooperative modified embodiment of the limiter cap of FIGS. 54–56, 59 and 60 of the invention.

Thus, in accordance with a modified peanut clip 948 of a second embodiment of the invention shown in FIG. 61, the location of locking ribs 81 and 83 may be shifted angularly relative to the associated other structural elements of each cap 80 and 82' to provide modified orienting ribs 944 and 946 located as shown in FIG. 61, i.e., on the opposite side of their associated limiter arms 166 and 168' from the rib-arm angular relationship shown in FIG. 60. Ribs 944 and 946 thus protrude away from one another in diametrically opposite directions in the locked-up condition of caps 80 and 82' when set to their rich/rich preassembled positions shown in FIG. 61. Hence cap ribs 944 and 946 never touch within the operational end-user range of rotation of each cap permitted by its limiter arm stop positions relative to the adjacent cap. The radial spacing between the caps can thus be varied as desired from a close clearance, or even touching, to as wide a cap spacing as needed to accommodate needle positions on any given carburetor by suitably dimensioning the lobe spacing of the modified orientor clip 948 shown in FIG. 61.

Clip 948 may be identical to clip 930, but preferably an internal groove 950 is provided in lobe 936 for receiving rib 944, and a similar groove 952 in lobe 938 for receiving rib 946 during the telescopic, endwise-insertion of the caps into clip 948 to pre-orient the caps in their lock up, rich/rich orientation illustrated in FIG. 61. With ribs 944 and 946 so seated in their associated clip grooves 950 and 952, a secure and preset angular orientation of the limiter caps is readily maintained by the encircling relationship of the clip lobes tending to retain ribs 944 and 946 in their associated clip grooves 950 and 952.

When the end user desires to make field needle valve adjustments on the engine between the maximum permissible rich and lean settings allowed by the limiter arms 166 and 168', rotational torque applied by a screw driver to the screw driver cap slot 182 will once again cause the aforementioned center-to-center clip spreading effect. However, the initial cap rotation to force either rib 944 or 946 out of its retaining groove 950, 952 will be accommodated by the spring flex action of the clip nip portions 940, 942 which allow the non-elastic clip elongation in the plane of the drawing of FIG. 61. The resilience of clip 948 at its waist will also accommodate the increased effective diameter of the limiter cap encircled by the associated clip lobe resulting from rib 944 and/or 946 bearing on the inner peripheral surface 134 of the clip lobe when out of registry with its associated clip groove. This cap diametrical enlargement effect also increases the clip-to-cap retention forces resisting unwanted engine-vibration-induced cap/needle valve unitary rotation, after being set to their desired adjustment positions, because of the increased spring stress created in the clip lobes.

Third Embodiment Cap Orientation Peanut Clip

Figure 62:
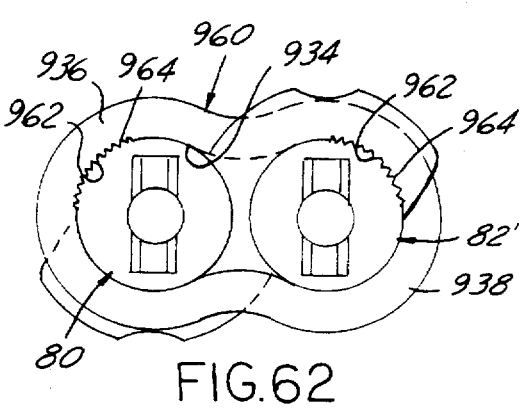
FIG. 62 is an end elevational view of a third embodiment orientor peanut clip of the invention installed on a cooperative further modified embodiment of the limiter cap of FIGS. 54–56, 59 and 60 of the invention.

FIG. 62 illustrates a third embodiment of a peanut clip 960 of the invention which may be identical to clips 930 and 948 except for the configuration of the inner peripheral surface 934 of the clip lobes 936 and 938 and the complimentary configuration on the exterior surface of the cylindrical body of caps 80 and 82'. The inner peripheral surface 934 of clip 960, at least in the portion extending circumferentially outside of the angles D and E, is preferably provided with an axially extending, circumferentially continuous row of internal spline teeth 962 which mesh mate with a corresponding row of axially extending circumferentially continuous row of external spline teeth 964 extending axially along the exterior surface of the body of caps 80 and 82. These clip and cap spline teeth 962 and 964 are rotationally drivingly engaged during slip-on installation of the caps within the clip. Preferably the pitch of teeth 62 and 64 is made fine enough to permit manual rotation of cap 80 and/or 82 relative to clip 960 without undue torsional resistance being created so as not to impair field rotational adjustment of the needle valves. In addition, the pitch increments preferably are small enough to provide increments of about 12° between each full engagement position of the external and internal spline teeth to thereby conform with this industry standardized rotational angle of minimum needle adjustment. Again, the diametrical expansion of clip lobes 936 and 938 created by ratcheting of the spline teeth during rotational adjustment, as permitted by clip elongation flex in the nip portions 940 and 942, varies directly with the pitch number of the spline teeth, and hence a fine spline pitch is desirable for this purpose also.

Fourth Embodiment Cap Orientation Peanut Clip

FIGS. 63–76 illustrate a fourth embodiment of a peanut clip 994 of the invention preferably constructed in the form shown to engineering scale in the views of FIGS. 63–69 and so incorporated into this specification. Clip 994 is similar to clip 930 in having the laterally spaced circular lobes 936 and 938 but these lobes are joined only at the upper nip portion 940'. The lower nip portion 942' is split centrally to provide a parting gap 945 to thereby form two resiliently flexible cantilevered legs 947 and 949 spaced apart at their free ends by parting gap 945. The dual-lobe inner periphery 934' of clip 994, like inner periphery 934 of clip 930, thus has a peanut-shaped contour in radial cross-section and diametrically sized for telescopingly receiving axially therethrough with a sliding press fit an idle or low speed limiter cap 300L in lobe 936, and a high speed limiter cap 300H in lobe 938 (FIGS. 70–76).

Each lobe 936 and 938 respectively has a rearwardly extending tab 951 and 953 flush at its outer surface with the associated lobe and spaced radially outwardly at its inwardly facing surface from the associated outer surfaces of caps 300L and 300H when received in the clip. Tabs 951 and 953 provide additional exterior surface area on the clip to facilitate manual pinch-grip of the clip between the thumb and index finger of the installer to facilitate manually handling the unitary subassembly of the two caps and clip by itself when separate from the carburetor as shown in FIG. 70 during installation slip-on, and to facilitate fixturing of the clip for assembly machine installation of the caps into the clip.

The form of clip 994 shown in FIGS. 63–76 is designed to cooperate with low and high speed limiter caps 300L and 300H which are constructed as two-stage, two-piece limiter caps identical to cap 300 described previously in conjunction with FIGS. 21–27. Caps 300L and 300H thus each contain the associated retainer clip 260 therein for the previously described two-stage installation on low speed needle 320 and high speed needle 320H, which in turn are constructed substantially identical to needle valve 320 described in conjunction with FIGS. 28–33. However, limiter arm 168 on high speed cap 3001H is axially positioned against the leading or forward end of the cap as best seen in FIGS. 70, 71, 73, 75 and 76. Limiter arm 166 of low speed cap 300L is spaced axially from the leading end of this cap about one third of its length, as best seen in FIG. 70 and 71.

Figure 66:
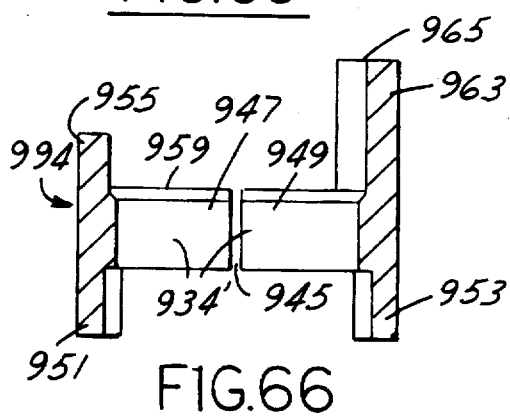
FIG. 66 is a cross-sectional view taken on the line 66—66 of FIG. 63.
Figure 67:
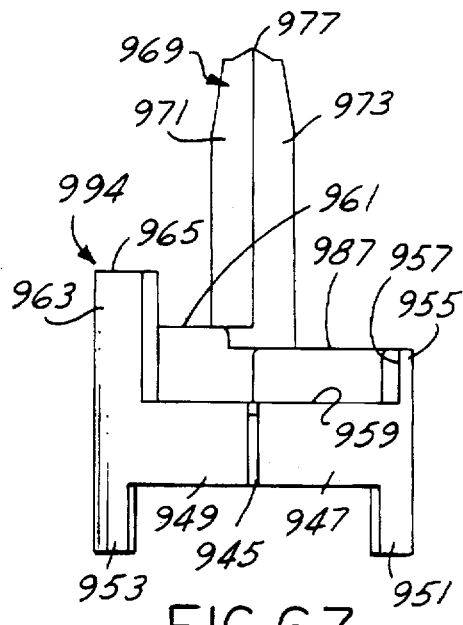
FIG. 67 is a bottom plan view of the orientor clip of FIGS. 63–66.
Figure 68:
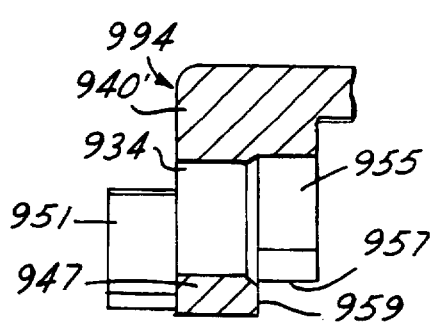
FIGS. 68 and 69 are fragmentary cross-sectional views taken on the lines 68—68 and 69—69 respectively of FIG. 64.
Figure 69:
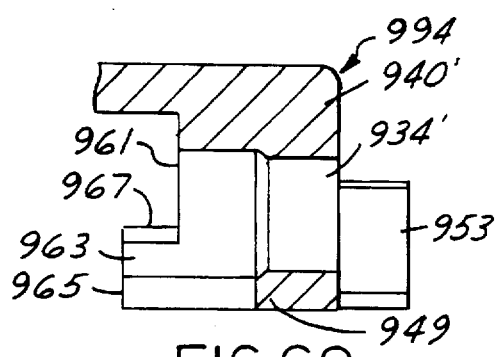
Figure 70:
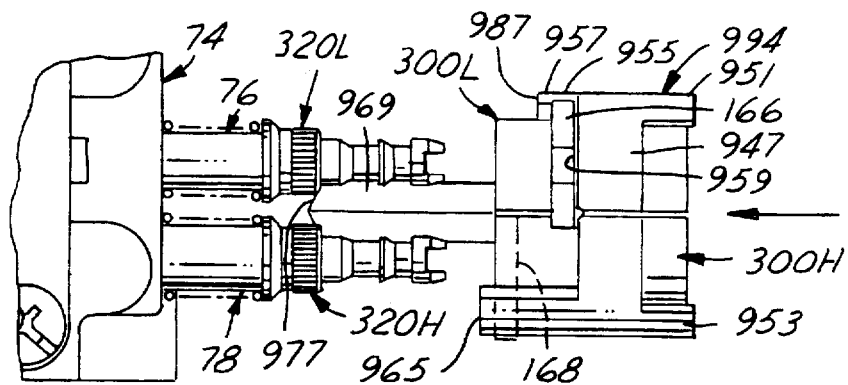
FIG. 70 is an exploded bottom plan view illustrating the orientor clip of FIGS. 63–69 with a pair of limiter caps preassembled therein ready for installation telescopically onto the heads of the pair of needle valves mounted in a carburetor.
Figure 71:
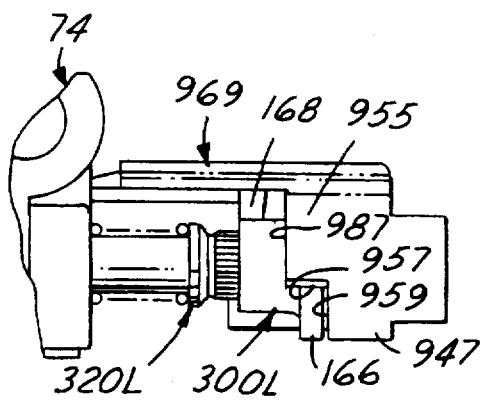
FIG. 71 is a side elevational view of the peanut clip and limiter cap subassembly installed in a first stage of assembly onto the needle valves.
Figure 72:
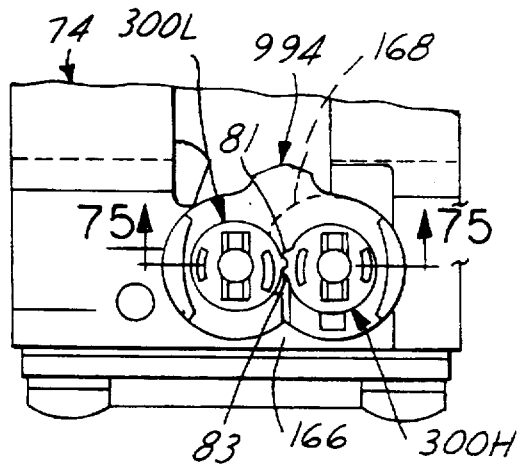
FIG. 72 is a end elevational view of the installation of FIG. 71.

In accordance with one feature of clip 994, the forward portion of clip 994 is configured with locking extensions constructed as shown in FIGS. 63, 64 and 66–69 to capture each of the limiter arms 166 and 168 against rotary bodily motion away from its abutted position against the mutually adjacent cap, i.e., the angular positions of the limiter caps seen in the end view of FIG. 72, but only when the caps are positioned axially in clip 994 as shown in FIGS. 70–75. Low speed cap 300L thus has a short forward extension 955 which provides an axially extending arm-stop edge 957 for capturing limiter arm 166 in the rich-rich lock-up position shown in FIG. 72. The captured position of arm 166 is also diagrammatically indicated in phantom by the dotted line showing of arm 166 in FIG. 64 and shown in solid in FIG. 70. It will also be seen that when cap 300L is fully axially inserted endwise into clip 994, arm 166 will abut the forward edge 959 of leg 947 (FIGS. 67, 70 and 71).

Figure 63:
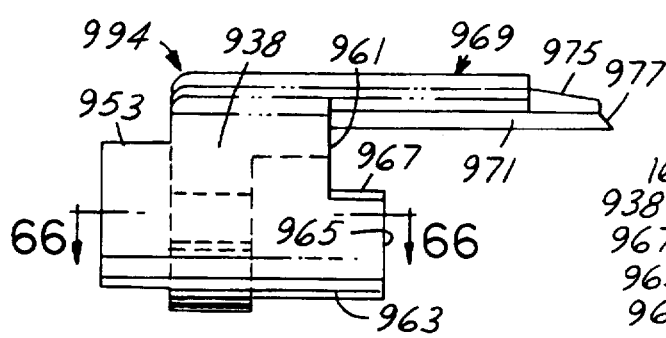
FIG. 63 is a side elevational view of a fourth embodiment orientor peanut clip of the invention.
Figure 64:
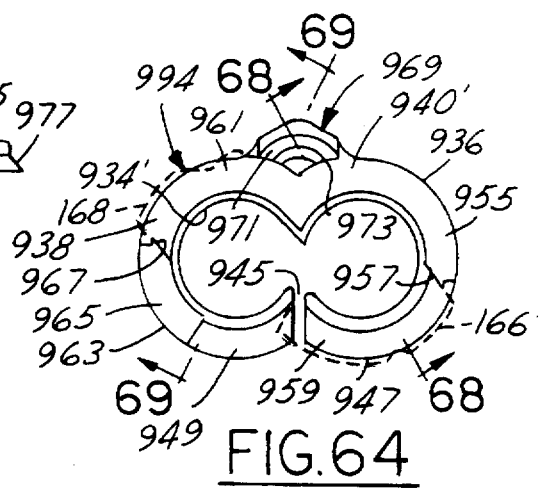
FIGS. 64 and 65 are end elevational views of the right hand and left hand ends respectively of the peanut clip as viewed in FIG. 63.
Figure 65:
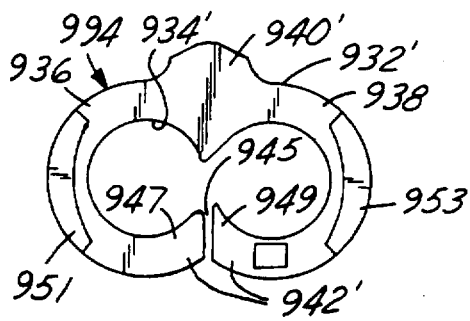

When high speed limiter cap 300H is inserted axially endwise into the forward end of clip 994 to its fully inserted position shown in FIG. 70, limiter arm 168 of cap 300H will abut a radially extending stop edge 961 provided as a cut-away edge in a forwardly extending stop portion 963 provided on the high speed side of clip 994. Stop extension 963 terminates at its forward edge at a radial edge 965. A limiter arm rotary lock up edge 967 extends axially between stop face 961 and extension end face 965 (FIGS. 63 and 64 and 66). The captured position of limiter arm 168 relative to stop edge 967 is indicated by the dotted line phantom showing of limiter arm 168 in FIG. 64 (see also FIG. 73).

In accordance with another feature of clip 994, and as best seen in FIGS. 63, 64, 67, 71, 73 and 74, clip 994 is also provided with a forwardly protruding stop leg 969 formed as an integral extension of the nip portion 940' of the clip and oriented with its longitudinal axis parallel to the clip lobe axes. The underside leg surfaces 971 and 973 (FIGS. 63, 64 and 67) are concave and have a clearance with the outer edge of limiter arms 166 and 168 so as not to interfere with rotary motion of the arms during their range of swing in the end-user rotational range of each cap. Preferably, the forward end of leg 69 is in the form of a slightly tapered foot 975 having a pointed toe end 977 (FIG. 74) continuing forward as an extension of the leg undersurfaces 971 and 973 and protruding beyond a flat stop face 979 of foot 975 that is disposed perpendicular to the longitudinal axis of leg 969.

Figure 73:
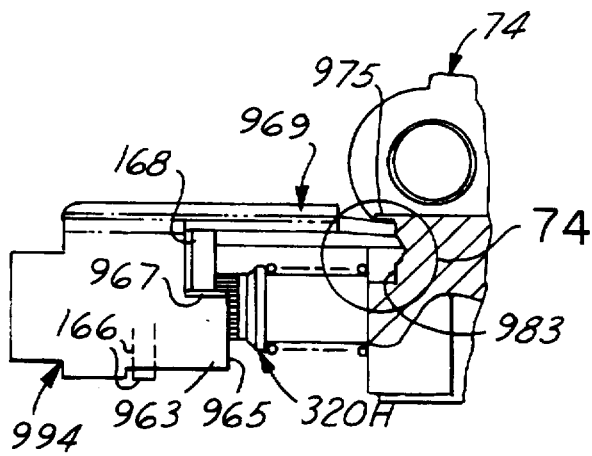
FIG. 73 is a side elevational view of the installation of FIG. 72 viewing the side opposite to that viewed in FIG. 71.
Figure 74:
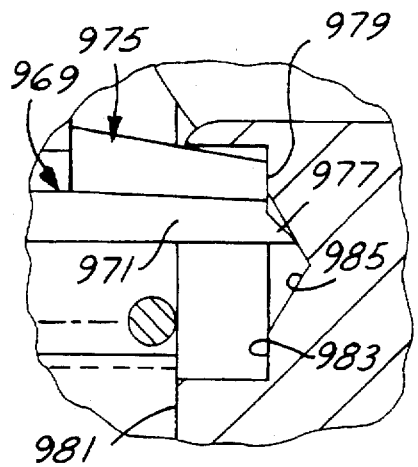
FIG. 74 is a greatly enlarged fragmentary view of the portion of FIG. 73 encompassed by the circle 74 of FIG. 73.
Figure 75:
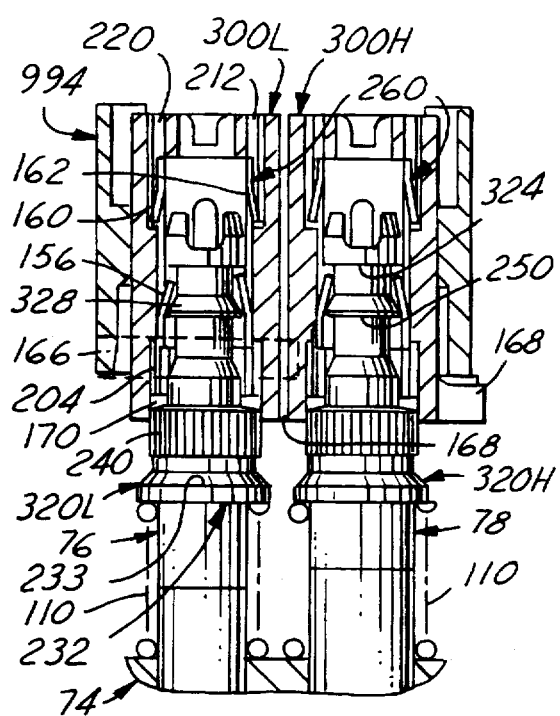
FIGS. 75 and 76 are fragmentary cross sectional views both taken on the line 75—75 of FIG. 72, FIG. 75 illustrating the first stage of installation of the clip and cap subassembly also shown in FIGS. 71 and 73, and FIG. 76 illustrating the limiter caps pushed inwardly to their second stage position on the needle valves.

As best seen in FIGS. 73 and 74, carburetor 974 is adapted for use with clip 94 by having an end face 981 of the needle mounting boss of the carburetor body spot face drilled to a predetermined depth to provide a flat stop surface 983 encircling the drill point recess 985. The distance from stop face 983 to shoulders 230 and 232 (FIGS. 75 and 76) of the high and low speed needles 320H and 320L is predetermined by factory carburetor final assembly adjustment. That is, the line 233 where the conical surface of shoulder 230, 232 reaches max diameter is used as a reference to measure a given distance from the casting face before the limiter caps are installed in the needles. The spot face depth of surface 983 and the width of the needle shoulder is determined by the number of "turns out" on the needle from needle bottom position. For example, a draw out of the needles of 1.375 turns for a 16.97 millimeter length of legs 969 and a 1.64 millimeter depth for spot face 983 from face 981, relative to the low speed needle 76 having a number six size, 40 pitch thread. The shoulders 230, 232 of both low and high speed needles 320L and 320H are also thus set at carburetor assembly to be flush with one another.

In the cap-to-clip assembly procedure, caps 300L and 300H are first nested side-by-side with their limiter arms rotated to abut the mutually adjacent cap. If orientor ribs 81 and 83 are also provided on the caps, the same are abutted in locked position as shown in FIG. 72. Then to assemble limiter caps 300L and 300H into clip 994 as so nested and angularly oriented, the caps are telescoped into their respective lobes 936 and 938 of the clip, limiter-arm-trailing, until arm 166 of cap 300L abuts stop surface 959 as shown in FIG. 70 and likewise arm 168 of cap 300H abuts stop surface 961. In this initial, fully installed position of the caps and clips, their leading ends will be flush and slightly inset from the free ends of tabs 951 and 953 as shown in FIG. 70.

Once the caps are fully so installed in the clip, limiter arm 166 of cap 300L is locked against angular motion about the axis of the cap by the circumferentially opposite radially extending edges of the arm respectively abutting cap 300H and stop edge 955 of extension 957. Likewise limiter arm 168 of angular motion about the cast angular motion about the cap axis by its circumferentially opposite radial edges respectively abutting cap 300L and clip stop edge 967. Preferably this is established as the rich-rich limit of the end-user adjustment range.

Clip 994 is preferably injection molded in one piece from a relatively rigid plastic material, such as Delrin 500, and the dual-lobed inner peripheral surface 934' of the clip is molded slightly undersize relative to the outside diameter of the respective caps to be press fit therein and in the form shown in FIGS. 63–69 surface 934' is formed as a smooth surface. Due to the slight resilience of clip legs 947 and 949 and their separation from one another by the parting gap 945 these legs can resiliently flex to expand the associated lobe inner diameter as the caps are slid into the lobe bores to thereby ensure a secure frictional grip on the caps while still permitting rotation of the caps within the clip lobes. The slight flexibility of the clip material cooperates with the cantilevered spring legs 947 and 949 to accommodate tolerance variations in the caps diametrically as well as in the center-to-center lateral spacing of the needle valves despite the rigidity of the upper arch/nip portion 940' of clip 994. This ability of clip 994 to resiliently flex by an enlargement of the parting gap 945 also accommodates the initial unlocking override of orientor ribs 81 and 83 when the same are provided on the caps. However, it is to be understood that orientor ribs 81 and 83 may be eliminated when using cap clip 994 because of the aforementioned rotary lock up of the limiter arms of the caps by the clip forward extensions when the caps are fully installed in the clip as shown in FIG. 70. It is also to be understood that clip 994 may have the aforementioned grooves 950 and 952 of clip 948 described in conjunction with FIG. 61, and the cooperative ribs 944, 946 provided on the low and high speed caps respectively in order to function as described in conjunction with FIG. 61. Likewise, if desired, the limiter caps may be held against engine vibration induced rotation in use by providing the aforementioned fine spline interengagement of splines 962 and 964 as described in conjunction with cap 960 in FIG. 62.

To install the subassembly of peanut clip 994 with caps 300L and 300H fully seated therein as in FIG. 70, the clip is gripped at its outer sides 951 and 953 and oriented as shown in FIG. 70 to telescope the open ends of the caps, limiter-arm-end first, over the needle heads and the peanut clip then pushed toward the carburetor until further push-on motion is stopped as toe 977 enters recess 985 and end face 979 of foot 975 abuts spot face 983 (FIGS. 71, 73 and 74). Stop leg 973 thus automatically positions caps 300L and 300H to register interior retainer clip 260 of each cap 300L, 300H in its first stage position shown in FIG. 75. In this position the inwardly protruding barbs 156 of the retainer clips have snapped into the grooves behind the needle heads, and hence the caps cannot be withdrawn from the needles once in this first stage installation position. It will be recalled that in the first stage the caps are free to rotate on the needles because the cap spline flutes 204 have not as yet engaged the needle shank splines 240 in this first stage condition. Hence with the caps so peanut-clip-installed, the needle valve heads can be directly engaged with an adjustment tool and factory adjusted to fine tune the engine as described previously to the desired rich-rich limits for the end-user adjustment range. It will be noted that the caps are held against rotation during such adjustment by the limiter arms being locked against rotation by the locking extensions of peanut clip 994.

Figure 76:
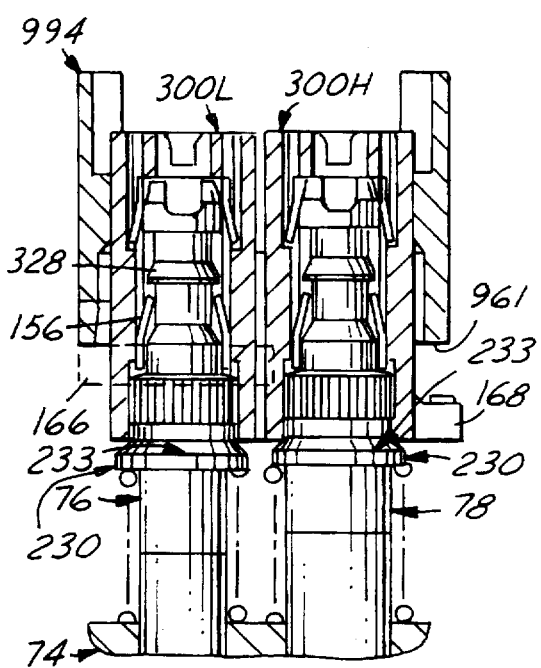

After the first stage engine adjustment has been performed, caps 300L and 300H may be individually or conjointly pushed inward toward the carburetor to the second stage position shown in FIG. 76. This engages the cap splines with the needle splines so that the caps and needles can rotate only in unison. However, peanut clip 994 remains leg-stopped in its first stage position when the caps are pushed to their second stage position due to the abutment of clip leg foot face 979 with the carburetor stop face 983. Hence this relative movement between the caps and peanut clip (as the caps are pushed in from the first to the second stage position) moves limiter arm 166 axially beyond the inner radial edge 987 of clip locking extension 955 (FIGS. 67 and 70), and likewise moves limiter arm 168 axially beyond the inner radial edge 965 of clip extension 963 (FIGS. 67, 70 and 73). Thus each of the limiter caps 300L and 300H is now rotationally unlocked from peanut clip 994 and is free to be rotated within the range established by the associated limiter arm, i.e., by the circumferentially opposite radial end faces of each limiter arm alternately abutting the outer surface of the mutually adjacent limiter cap, as described previously.

If desired, peanut clip 994 may then be pulled off of the fully carburetor-installed and needle-locked limiter caps for reuse with another pair of limiter caps to be preinstalled therein as described previously. However, preferably clip 994, like clips 930, 948 and 960, is retained on the caps during use of the carburetor on an engine powered appliance. The frictional grip of the peanut clip on the caps helps retain then set in whatever adjusted position is desired, and resists unwanted cap rotation due to engine operational vibration. Indeed, when provided with the interengaging splines 962 and 964 described in conjunction with clip 960 of FIG. 62 the usual anti-rotation springs 110 may be eliminated.

In addition, should it be desired retain biasing force on both of the needle valves axially outwardly away from the carburetor, in order to keep the outer faces of the needle threads engaged against the inner faces of the carburetor threads to maintain extra precision needle adjustment only a single light coil spring (not shown) need be used for this purpose. Such a light spring can be mounted by telescopically inserting it over the free end of leg 969, and by providing a suitable stop abutment (not shown) on the leg located inwardly of the second stage position of limiter arm 168. The end coils of this light spring then would abut against the leg stop and the opposed face of the carburetor. Since this single light spring need not serve as an anti-rotation spring for the needle valves, its end coils need not be ground flat like those of springs 110, thereby providing additional cost savings in this regard.

If it is desired to further resist pull-off or push-off of clip 994 from the caps in their second stage position, a suitable circumferentially extending groove (not shown) can be provided in each cap axially positioned to receive therein (when in the FIG. 76 position) an internally protruding detent "bump" provided on the interior facing surface of legs 947 and 949. This yieldable detent would then retain the peanut clip 994 axially fixed on the installed caps with sufficient resistance force to resist, for example, the push-off tendency of the biasing force of the aforementioned single light spring sleeved on leg 969.

Advantages of Peanut Clip

The aforementioned limiter cap orientor peanut clips 930, 948, 960 and 994 thus offer many further advantages, as follows:

1. The peanut clips provide preassembly packaging of both high speed and idle limiter caps, and they are readily applicable to all of the limiter caps embodiments previously disclosed herein as well as in the '634 and '645 patents. This provides a significant cost reduction to the OEM engine customer in assembly of limiter caps to the needle valves installed on the carburetor during test running on the engine. When used as an inexpensive "throw-away" retainer for this purpose only, the clip can be discarded. Alternatively, it can be re-used with another set of caps either by the engine or carburetor manufacturer after limiter cap final installation. This applies to all embodiments of limiter caps described previously, except for those limiter caps wherein the peanut clip is purposely permanently retained, as for example, when the peanut clip is axially captured between the limiter arms 166 and 168' when the caps are locked on their needles.

2. The peanut clips maintain the rich/rich orientation of the side-by-side paired limiter caps in a secure but rotationally yieldably releasable manner during packaging, shipment, handling and assembly to and adjustment on the needle valves.

3. The peanut clips can operate as a variable spacer for the paired limiter caps both prior to and after installation on the needle valves, and maintain the cap axes parallel and accurately oriented.

4. The peanut clips can function as a needle stabilizer during engine operation by restraining wobbling movement of the outer ends of the needles induced by harmonic vibration of the needles induced by engine operational vibration, thereby preventing air leaks through the threads of the needles which can be caused by this condition.

5. The peanut clips also serve as a means of preventing undesirable rotation of the needle valves out of desired adjustment during engine operation. Hence the peanut clips can take over this function now served by the coil springs 110 and therefore such springs can be made in less expensive form or one or both eliminated altogether.

6. Due to the free state "hour-glass" or peanut shape of the peanut clips, either with or without a parting gap, the same can be made from a wide range of materials while still serving the aforementioned functions. That is, in the ribbed or splined caps and cooperative peanut clip embodiments the clip material must be such as to permit spring flexing of the nip portions 940 and 942 or legs 947, 949, but these materials need not be elastic. A non-elastic, non-flexible rigid clip material is also usable in the clip lobes when interference fit frictional grip is solely relied upon for cap rotational yieldable restraint.

7. The peanut clip may be made in a highly visible color, such as white, yellow or orange, so as to readily visibly outline the location of the limiter caps and needle valves on the engine during the production fine tune test and adjustment stage. The limiter caps then can be made in different colors, perhaps a color not so readily visible but more in keeping with an appropriate color coding, such as standardized black and white to respectively more universally identify their function as high and low speed adjustment needles.

8. The peanut clip also helps stabilize those limiter caps of the two stage type against vibration while in their first stage installation condition, and when the engine is running and being fine tuned by the OEM engine manufacturer personnel and/or by automatic equipment, thereby facilitating such manual and robotic factory needle rotational adjustment.

9. The limiter arms on the limiter caps can be readily re-oriented so as to capture the peanut clip, as in the peanut clip embodiments of FIGS. 54–62, for permanent and secure retention of the peanut clip on the caps to serve its many advantageous functions throughout the operational and service life of the engine, a feature applicable to any of the limiter caps and to the peanut clips of FIGS. 54–62 disclosed herein as well as to limiter caps of the aforementioned '634 and '645 patents.

10. In those limiter cap embodiments having mold-core formed barb-receiving locking grooves 210, 212 opening to the outer end face of the cap, authorized cap removal from its needle-installed and locked condition can be achieved, if desired, by providing a specially designed cap removal tool (not shown). For example, a pair of specially designed long, thin, narrow and stiff metal blades can be inserted endwise axially one into each of grooves 210 and 212 to thereby depress the outwardly protruding spring barbs 160 and 162 so that their free ends are held inwardly of cap locking shoulders 214 and 2116 (FIG. 11) by such blades. While the blades are thus held in place relative to the cap, the cap can then be pulled off of the associated retainer clip and needle valve. Then the retainer clip can also be removed from the needle, as by inserting a screw driver blade into its parting gap 154 to spread open the resilient clip circumferentially for lateral pull-off from the needle valve. The clip and cap can then be re-assembled and re-used as before. However, the anti-tampering feature of the cap is nevertheless preserved because such removal procedure is not evident to, nor such removal tool readily available to, the appliance end-user customer due to the concealed nature of barbs 160 and 162 and the hidden manner of their functioning within the cap when locked on the needle valve.

11. The peanut clip fourth embodiment of FIGS. 63–76 facilitates reliable and error free installation of the limiter caps into their first stage position due to the stop leg abutting the carburetor body as the clip and cap subassemblies are pushed onto the needle ends. This prevents premature installation of caps directly to their second stage locked-on position, either when being installed by the engine manufacturing personnel or when preinstalled by the carburetor manufacture and shipped with the caps in first stage position. This feature thus provides considerable labor and material cost savings to both carburetor and engine manufacturers.

Figure 57:
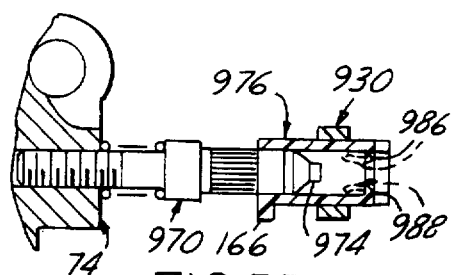
FIGS. 57 and 58 are views corresponding to FIGS. 55 and 56 respectively but illustrating a modified anti-tamper flap limiter cap and modified needle valve of the invention used with the orientor peanut clip of FIGS. 54–56, the peanut clip and cap being shown in longitudinal center section and the needle valve in side elevation.
Figure 58:
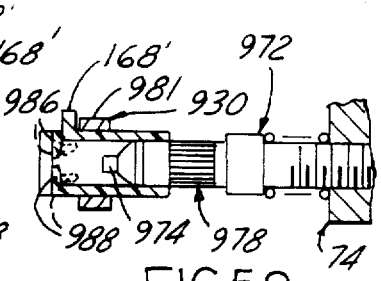

Male Head Needle Valve Embodiment and Associated Anti-Tamper Flap Limiter Cap Embodiment FIGS. 57, 58, 58A and 58B also illustrate a further modified needle valve 970, 972 (idle and high speed respectively) which may be identical to needle valves 76 and 78 except for a modified outer free end of the needle valves. That is, instead of the needle valves having a female cross-slot for reception of the male blade head of a screw driver, the needle heads are formed with integral male projection 974 which as illustrated is in the form of a four-sided square nut (FIG. 58B) having a flat end face (FIGS. 57, 58).

The limiter caps may be likewise modified, as illustrated by caps 976 and 978, such that the outer end of the cap has a circular access opening 980 of the same diameter as the main bore of the cap, or that of the retainer clip in the interior/retaining cap/clip embodiments disclosed hereinabove. The margin of the tubular wall of the cap body at its open end is provided with two diametrically aligned screw driver adjustment slots 982 and 984 (FIG. 58B). A pair of cooperative anti-tamper flap leaves 986 and 988 are integrally molded during injection molding of the plastic material of the cap into the shape of semi-circles in plan view (similar to flap leaves 914 and 916 of leaf flap 912 described previously) and to have a normal free state condition of repose with the flaps in fully closed position (the condition shown in solid lines in FIGS. 57, 58 and 58B).

Figure 58A:
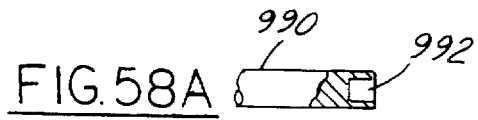
FIGS. 58A is a fragmentary, part side elevation part center sectional view of the working end of a needle valve adjustment tool of the invention for use with the embodiment of FIGS. 57 and 58.
Figure 58B:
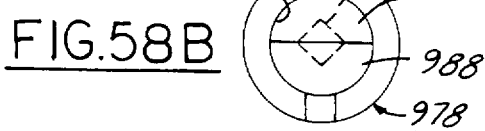
FIG. 58B is an end elevation view of the limiter caps of FIGS. 57 and 58.

Referring to FIG. 58A a specially constructed needle valve adjustment tool 990 may be provided for use with needles 970, 972 and caps 976 and 978. Tool 990 thus has an open-ended four face socket 992 at its working end adapted to individually snugly slip over the integral needle nuts 974 for rotational adjustment of the needle valves, but only by designated personal or robotic equipment of the OEM engine manufacturer and carburetor manufacturer as well as authorized field service personnel. The outside diameter of the shank of tool 990 is dimensioned to permit a relatively close sliding fit into the access opening 980 and interior cap bore 981, but with sufficient clearance so that the end of the tool can be used to flex apart the anti-tamper flap leaves 986 and 988 and bend them into a conforming curvature inwardly as indicated by their broken line positions in FIGS. 57 and 58. This permits entry of the tool endwise for telescopic socket engagement with the needle nut 974 for needle adjustment during the engine fine tune run in stage. When tool 990 is removed, anti-tamper flaps 986 and 988, due to their plastic elastic memory, flex back to their closed positions with their free edges meeting. Then during further push-on movement of the caps to second stage final lock position, the end face of needle nut 974 abuts the inner surfaces of the flap leaves in their closed position to hold them against movement inwardly of the cap. Thus limiter caps 976 and 978 as so provided with anti-tamper flaps and used with male end needle valves 970 and 972 are tamper-proof in a manner similar to limiter caps 852, 900 and 910 described previously in conjunction with FIGS. 42–53.

In addition, should end users improperly attempt to destroy flaps 986 and 988 with a screw driver, needle nose pliers or the like hand tool in order to improperly gain access to the adjustment end of the needle valve, and then try to rotate it beyond the end limits of the limiter cap rotational travel, their efforts will be defeated by needle valve 970, 972. Because of its unslotted male end, needle 970, 972 cannot be adjusted with a screw driver or pliers but rather only with socket-head type adjustment tool such as tool 990.

Additionally, by making the socket four-sided and non-standard size, the typical socket wrench sets will not have an appropriate mating socket to fit nuts 974. To this end, other odd shapes can be utilized for the shape of the nuts 974 as well as for the corresponding adjustment tool sockets. For example, the nut may be made cylindrical with external splines and corresponding mating internal splines provided in the nut-engaging socket of the adjustment tool (not shown). Likewise, the nut and socket may be made diamond shaped for the same purpose. Since authorized needle adjustment is only to be performed by authorized personnel and/or automatic equipment of the carburetor manufacturer and OEM engine manufacturer, only a limited number of special tools 990 need be made and provided for such "keyed-lock" rotational adjustment of needle valves. Hence the cost of providing these special adjustment tools is not excessive under the circumstances, and manufacturing cost of the needle valves is not materially increased. With this feature, rotary adjustment of needle valve 970, 972 by the end user is only possible by engaging the cap slots 182 with an ordinary straight-bladed screw driver or the like so that only the limiter caps can be rotated within the predetermined limits set by the cap limiter arms.

Overall Advantages of Cap/Interior Retaining Clip and Cooperative Needle Embodiments In addition to the features and advantages set forth hereinabove (as well as in the '634 and '645 patents), the various embodiments of spring steel retaining clips described and illustrated with reference to FIGS. 5–52 offer many further features and advantages in manufacture, adjustment, operation and end use. The limiter caps of these embodiments provide an easy slip fit, push-on installation mode, whether of the single stage or two stage type, due to the mating telescopic mesh of the precision splines of the needle and cap. The various spring barbs and tabs of the cap-interior retaining clips provide snap-in, clip-to-cap and clip-to-needle one-way locking action in certain of the embodiments, and similar two-way locking action in others. Because the cap-to-needle locking function is transferred to the intervening spring steel retaining clip, the material of limiter cap itself need not be selected to be stretchably resilient as disclosed, by way of example, in the aforementioned '634 and '645 patents. Hence the caps may be made from a wider selection of materials, ranging from relatively soft plastics such as polypropylene and Delrin up to very hard, non-elastic and non-resilient materials such as various thermoset plastics (e.g., Bakelite) and die casting metals, such as zinc and aluminum alloys. When the caps are made of such rigid strong materials they offer further resistance to tampering by the end users when attempting to accomplish improper needle valve adjustment.

The snap action retention features of the cap/spring/clip/needle valve combinations as disclosed hereinabove also provide more reliable assembly of the clip to the cap and of the cap to the needle valve for both single and two-stage mode limiter caps, clips and needle combinations. Each stage of such installation is readily indicated to the assembler by both feel and sound (i.e., on audible click), thereby reducing defective assemblies at both the carburetor manufacturing installation and OEM engine manufacturing installation. By retaining the outer configuration of the present commercially used limiter caps of the '634 and '645 patents, change over costs to incorporate the caps of the invention as disclosed herein are also significantly reduced. In addition, the force required to strip the caps and from their needles is greatly increased by the metal interior retaining clip snap lock cooperation with both the limiter cap and associated needle valve.

What is claimed is:

1. In a cap for limiting adjustment of fuel flow in a carburetor by a valve having a rotatable shank with a head end projecting from the carburetor, said cap being of the type comprising a body having a passage therein having one end open and being constructed and arranged to be telescopically received open end first over the head end of the shank of the valve, retainer means in said passage constructed and arranged to retain said body in a telescoped position on the shank, engagement means in said passage constructed and arranged to engage with the head end when said body is telescoped over the shank and in a rotational lock-up first position to couple the shank with said body so that the shank and said body can rotate only in unison when said body is the first position, an arm fixed to said body and projecting generally radially thereof and constructed and arranged to limit the extent of rotation of said body to less than one revolution when said body is in the first position by engagement of said arm with at least one stop operable to limit the conjoint rotation of the shank and cap to less than one complete revolution to thereby limit adjustment of the valve, said body having a free end axially opposite said open end and protruding beyond said valve shank head when said cap is so installed in the first position on the valve shank; the improvement in combination therewith wherein said retainer means comprise a spring material retainer clip received in said body passage, said retainer clip having first and second flexible resilient barbs protruding respectively exteriorly and interiorly of said sleeve, said first and second barbs being oriented relative to one another to respectively engage said body and the valve shank to respectively prevent retrograde relative telescopic motion between said clip and body and between said clip and the valve shank.

2. The cap of claim 1 wherein said retainer clip is in the form of a hollow sleeve split lengthwise to define a parting gap therein, said sleeve having a free state diameter greater than that of said body passage and being radially compressible to ensmall the sleeve diameter for facilitating telescopic insertion of the sleeve into said body passage.

3. The cap of claim 1 wherein said retainer clip is made of spring metal material and said cap body is made of relatively rigid plastic material.

4. The cap of claim 1 wherein said clip is made of spring metal material and said cap body is made of rigid metallic material.

5. The cap of claim 1 wherein said body passage is closed at said free end thereof in a manner to prevent access therethrough of an adjustment tool to the valve shank head.

6. The cap of claim 5 which also comprises a recess in said free end of said body having a non-circular cross-section and constructed and arranged to receive a tool therein for rotating the cap relative to the carburetor.

7. The cap of claim 6 wherein said recess comprises a screw driver receiving slot.

8. The cap of claim 1 wherein said clip is also constructed and arranged to axially retain said body on the valve shank by engagement of said second barb with the valve shank in a rotationally unlocked telescoped second position of said cap on the shank axially displaced from the lock-up first position whereby in the second position of said cap the shank is freely rotatable relative to said clip and body, and wherein said passage extends completely through said body and said body and clip are constructed and arranged to permit an adjustment tool to be disposed therein and engaged with the head end of the shank for rotating the shank relative to the carburetor when the cap is in the second position.

9. The cap of claim 1 which also comprises ramp means disposed in said body adjacent said retainer clip and constructed and arranged to facilitate engagement of said body and the shank with said clip barbs when said body, retainer clip and shank are generally axially telescoped relative to one another.

10. The cap of claim 1 including in combination therewith another limiter cap constructed and arranged with a second body and second retainer clip substantially identical to those of said first-mentioned cap to be telescopingly received over a shank of another fuel flow adjusting valve of the carburetor which projects into the arcuate path of rotation of said arm of said first mentioned body at least when said first mentioned body is in its rotationally locked position.

11. The cap of claim 10 including in combination therewith a peanut shaped clip having a pair of first and second end lobes respectively encircling most of the circumference of said cap first and second bodies and having laterally spaced nip portions connected to said end lobes and generally spanning the space therebetween for holding said caps in a paired side-by-side subassembly for telescopic installation and rotational orientation on their respective valve shanks.

12. The cap of claim 11 wherein one of said nip portions of said peanut clip is split to form a parting gap therein to thereby separate said one nip portion into first and second resiliently flexible spring legs respectively cantilevered from said first and second lobes.

13. The cap of claim 1 wherein the valve shank is of the type having an external spline flute portion spaced axially inwardly of the shank head, and wherein said engagement means of said body comprises internal spline flutes axially spaced from said retainer clip toward said body passage open end and adapted to have a telescopic mating spline fit with the shank external spline flute portion when said body is in the rotationally locked first position on the shank.

14. In a carburetor having a valve for adjusting fuel flow by rotating a shank of said valve by engaging a head end of said valve shank projecting from the carburetor, a limiter cap of the type having a body with a passage therein constructed and arranged to be telescopically received over said head end of said shank, detent means for axially retaining said cap on said shank comprising a recess in one of said head end of said shank and said body passage, a projection on the other one of said shank head and said body passage, at least one of said recess and said projection being substantially circumferentially continuous, said recess and projection being constructed and arranged so that when said body is telescoped over said shank in a first position said projection is received in said recess so that said shank can be rotated relative to said body while said body is axially retained on said shank, said body having a valve rotating engagement portion in said cap body passage constructed and arranged to rotationally drivingly engage with said shank when said body is received on the shank in a second position axially spaced from the first position to thereby couple said body to said shank for rotation only in unison therewith, an arm fixed to said body and projecting generally radially thereof and constructed and arranged to limit the extent of rotation of said body to less than one complete revolution at least when said body is in either of the first and second positions by engagement of said arm with at least one stop carried by the carburetor and projecting into the arcuate path of rotary movement of said arm, whereby when said body is telescoped over said shank and is axially disposed in the first position said shank can rotate relative to the body while axially retained thereon and when said body is in the second position said shank and said body can be rotated only in unison to less than one complete revolution to thereby limit adjustment of the valve; the improvement in combination therewith wherein said detent means of said body is formed by a resiliently flexible portion of a retainer clip made of spring material and secured axially in said cap body.

15. The combination of claim 14 wherein said shank is of the type having an external spline thereon spaced axially inwardly of said shank head, said cap body having an internal spline forming said valve rotating engagement portion in said body passage and being telescopically spline meshable with said shank spline when said body is in the

39 second position on the shank, said body and said arm are constructed in one-piece of a homogenous material which is relatively rigid.

16. The combination of claim 15 wherein said body passage extends completely through said body and is constructed and arranged to permit an adjustment tool to be disposed therein and engaged with said head end of said shank to thereby adapt said cap for rotating said shank relative to the carburetor when said body is telescopically received on said shank in the first position.

17. The combination of claim 16 which also comprises an externally accessible recess in a free end of said body protruding axially beyond said shank head, said body free end recess having a non-circular cross-section and constructed and arranged to receive a tool therein for rotating said body relative to the carburetor whereby when said body is in the second position rotation of said body by the tool disposed in said body external recess is adapted to drivingly rotate said shank to adjust fuel flow of the carburetor.

18. The combination of claim 17 wherein said recess of said detent means comprises a pair of axially spaced valve shank recesses disposed on said shank between said shank head end and said shank external spline, said retainer clip having a flexible spring barb forming said projection of said detent means and arranged for successive snap-in engagement individually with said pair of shank recesses when said body is generally successively axially telescopically moved to the first position and then to the second position to successively prevent retrograde movement of said body from said positions.

19. The combination of claim 14 including in further combination therewith a second cap substantially identical to said first-mentioned cap and adapted to be telescopingly received over a shank of another fuel flow adjusting valve of the carburetor which projects into the arcuate path of rotation of said arm of said first-mentioned body to thereby serve as the stop carried by the carburetor at least when said first-mentioned cap body is in its second position, and a cap holding and orienting clip having first and second end lobe portions respectively encircling most of the circumference of said bodies of said first and second caps and having first and second nip portions connected to said lobes and generally spanning the space between said cap bodies for holding said caps in a paired side-by-side subassembly for telescopic installation and rotational orientation on their respective valve shanks.

20. The combination of claim 19 wherein said body arms are axially spaced from one another when said caps are oriented with their ends flush with one another, said cap holding and orienting clip being disposed between said arms axially of said caps such that said clip is captured on said caps by said arms flanking said clip.

21. The combination of claim 19 wherein said cap orienting clip and said cap bodies have means for resisting rotation of said caps on said shank.

22. The combination of claim 14 wherein said recess of said detent means is formed in said shank and said projection comprises a first resilient barb on said retainer clip operable for spring detent engagement with said shank recess, said clip also having a second resilient barb spaced axially of said cap body from said first barb, and wherein said cap body has latching means in said body passage constructed and arranged for spring detent locking engagement with said second barb when said body and clip are telescoped together to retard removal of the cap body from said clip.

23. In a method of adjusting the fuel flow of a carburetor and limiting further adjustment thereof of the type involving the steps of:

40

(a) providing a carburetor having at least one valve for adjusting fuel flow by rotating a shank of the valve projecting from the carburetor, the valve shank having a rotator end head and a stop shoulder spaced axially therefrom with a first recess between the shank head and stop shoulder and a second recess adjacent a side of the stop shoulder remote from the shank head, (b) providing a limiter cap having a body with a passage therein opening at one end and constructed and arranged to be telescopically received open end first over the head end of the one valve shank for retention of the body in a first position on the one valve shank with the body being freely rotatable relative to such shank, and shank engagement means in the body passage and constructed and arranged to rotatably drivingingly engage with the cap engagement means on the one valve shank when the cap body is telescoped thereover and in a second position axially spaced from the first position to couple the one valve shank with the body for rotation only in unison therewith, (c) providing a limiter arm fixed to the body and projecting generally radially therefrom and constructed and arranged to limit the extent of rotation of the one valve shank to less than one revolution due to engagement of the arm with at least one stop carried by the carburetor when the body is in the second position, (d) providing a spring material retainer clip constructed and arranged to be telescopically received within the cap body passage and having resiliently flexible internal and external detents, (e) telescopically assembling the retainer clip into the open end of the body passage to an installed position such that the external detent retains the clip and body against axial relative motion therebetween, (f) then mounting the cap on the one valve shank with the body telescoped over the shank and in the first position thereof on the shank by sliding the body and clip open end first to cause the shank head to flex the clip internal detent until the clip internal detent is moved axially past the shank head and then springs into the first shank recess with an audible click to signify cap retrograde axial retention of the cap on the shank in the first position, (g) mounting the carburetor on an engine with which it will be utilized, (h) thereafter while operating the engine and with the cap in the first position on the one valve shank making any further needed adjustment of the one valve by rotating its shank to fine tune fuel flow to optimize predetermined operating parameters of the engine, and (i) after step (h) moving the cap body to the second position on the one valve shank by sliding the body and clip so as to flex the clip internal detent by moving it over the shank stop shoulder and then spring into the second shank recess with an audible click to signify cap retrograde axial retention of the cap on the shank in the second position while concurrently causing interengagement coupling of the shank and cap engagement means to thereby limit any subsequent adjustment of the valve due to the arm of the cap bearing on at least one stop carried by the carburetor and disposed in the arcuate path of movement of the arm at least while the cap is in the second position on the one valve shank.

24. The method of claim 23 which also comprises providing in step (a) external splines on the one valve shank spaced from the stop shoulder by the second shank recess to serve as the rotary cap coupling means of the one valve shank and in step (b) providing the rotary shank coupling means in the cap in the form of internal splines in the cap body adjacent the body open end constructed and arranged to releasably slidable telescopically with the shank external splines to thereby rotatably couple the shank and body when the body is telescoped over the shank into the second position.

25. The method of claim 23 further comprising the further steps of:
  (j) providing a second valve side-by-side with the one valve, a second limiter cap, a second limiter arm on the second cap, a second retainer clip in the second cap all constructed, arranged and mounted relative to one another on said second valve in like manner as recited in steps (a) through (f), and
  (k) thereafter repeating steps (h) and (i) in like manner with respect to the second valve and second cap.

26. The method of claim 25 which also comprises providing a paired cap holding and orienting clip having first and second lobes for respectively telescopically receiving therein the first and second caps therein for coaxial alignment with their respective valve shanks, mounting the caps in the clip lobes prior to installation on the valve shanks, and then mounting the caps on their respective valve shanks and performing steps (d) through (k) while the caps are being held by the orienting clip lobes.

27. A limiter cap adapted for end-user-non-removable installation in surrounding relation over the adjustment head of a rotationally adjustable fuel flow control valve of a carburetor having a shank joined to the valve head, said cap comprising a tubular body having a hollow interior and being open at least at one axial end, and a retainer clip end-user-non-removably carried within said body interior and defining therewith a hollow interior passageway open at least at one axial end closest to said body open end, said body and clip passageway being constructed and arranged to telescopically receive the valve head and a portion of the valve shank therein with a close sliding clearance fit between the valve head and passageway and such that the valve head is covered by said cap in a fully installed position of said cap on the valve shank, said clip having a resilient detent member yieldably protruding inwardly into said passageway adapted for detent engagement with a first locking portion of the valve shank that is spaced axially inwardly therealong from the free end of the valve head to thereby prevent retrograde telescopic end-user removal of the cap from the fully installed position thereof on the valve head, said cap having shank engagement means constructed and arranged for co-rotational driving telescopic engagement with the valve shank in the fully installed position of the cap on the valve shank, said cap also having rotation limiter means cooperable with stop means operably connected to the carburetor for limiting cap rotation to less than one revolution in the fully installed position thereof.

28. The cap of claim 27 wherein said retainer clip comprises an elongate strip of spring material telescopically inserted into the hollow interior of said cap body and axially fixed therein when fully installed therein, and said detent member comprises a first barb joined integrally at one end to said strip and constructed to yieldably protrude into the passageway interior at an opposite free end of said first barb in a free state condition of said first barb, said first barb being oriented to engage said valve to resist pull-off motion of said strip and hence said cap from the valve head in the fully installed position of said cap on the valve.

29. The cap of claim 28 wherein said clip retainer strip has a second barb joined integrally at one end to said strip and constructed to yieldably protrude from said strip at an opposite free end of said second barb in a free state condition and oriented to engage said cap body to resist retrograde pull-off motion of said cap body from said strip in the fully installed position of said strip in said cap body.

30. The cap of claim 29 wherein said clip strip and said barbs are formed as a one-piece stamping from a sheet of spring metal.

31. The cap of claim 30 wherein said retainer clip strip comprises a hollow sleeve constructed and arranged to fit closely concentrically against the interior surface of said cap body defining the hollow interior thereof.

32. The cap of claim 31 wherein said retainer clip sleeve is split lengthwise to form a parting gap and said sleeve has a free state diameter slightly greater than that of the hollow interior of said cap body and is resiliently yieldably to diametrically ensmall said sleeve for telescopic insertion into said cap body interior.

33. The cap of claim 27 adapted for use with the valve shank when having a second locking portion spaced axially therealong between the shank first locking portion and the shank head, said clip detent being adapted to yieldably protrude into the shank second locking portion in a partially installed position of said cap of the shank to resist retrograde pull-off motion of said cap from the shank, said cap shank engagement means being decoupled from co-rotational driving engagement with the shank in the partially installed position of said cap.

34. The cap of claim 33 wherein said cap body has valve shank rotary adjustment tool access opening in the free end of said cap body opposite said one body end, and said body has interior flap means for yieldably closing said access opening in the partially installed position of said cap in the valve shank with the shank head spaced axially from said flap means, said flap means being adapted to be positively held closed in the fully installed position of said cap on the valve by abutting engagement with the valve shank head.

35. The cap of claim 34 wherein said cap body and flap means are made as one piece from plastic material and said flap means includes living hinge means flexibly connecting said flap means to said cap body material and such that said flap means is swingable on said hinge means for opening and closing said access opening.

36. The cap of claim 35 wherein said flap means is in the form of a slitted iris to form a plurality of free end portions meeting together in the closed position of said flap means.

37. The cap of claim 35 wherein said flap means comprises a single flap member constructed and arranged with a free end opposite said living hinge means and disposed oppositely from said hinge means transversely of the cap passageway in the closed position of said flap means.

38. The cap of claim 35 wherein said flap means is constructed as a pair of the flaps with respective free ends meeting centrally of the body passageway in the closed position of said flap means.

39. A limiter-cap-receiving valve member for adjusting fuel flow in a carburetor having a generally cylindrical rotatable elongate shank with a flow controlling valve control surface at one end, a rotationally manipulatable head at the axially opposite end of said shank having a given maximum diameter, an externally threaded portion on said shank adjacent said one end for threadably adjusting the axial position of the valve control surface when operably installed in the carburetor, a limiter cap stop flange protruding radially of said shank and located axially between said head and threaded portion, a radially enlarged externally fluted spline portion protruding radially from said shank and located axially between said flange and said head, and a shank groove portion located axially between said head and spline portion and having a cylindrical surface of reduced diameter relative to said head maximum diameter and disposed adjacent thereto to define a first head-shoulder junction therewith, said shank groove portion also having a conically tapering portion extending axially from said reduced diameter cylindrical surface toward said spline portion and increasing in diameter from minor to major diameter portions thereof in the direction toward said spline portion.

40. The valve member of claim 39 wherein said cap stop flange has a generally conical surface tapering divergently away from said head between minor and major diameter portions thereof respectively less than and greater than those of said spline portion.

41. The valve member of claim 40 provided for use with a two-stage limiter cap and wherein said shank also has a secondary head portion disposed between said reduced diameter cylindrical surface and said conically tapering portion of said groove portion, said secondary head portion having a generally conical surface divergent away from said head, said secondary head terminating at a second cylindrical surface on said shank of reduced diameter relative to the maximum diameter of said secondary head portion to define therewith a secondary head-shoulder junction, said second cylindrical surface being contiguous with the minor diameter portion of said conically tapering portion of said shank groove portion.

42. The valve member of claim 39 in combination with a single stage limiter cap for end-user-non-removable installation in surrounding relation over said valve head, said cap comprising a tubular body having a hollow interior and being open at least at one axial end, and a retainer clip end-user-non-removably carried within said body interior and defining therewith a hollow interior passageway open at least at one axial end closest to said body open end, said body and clip passageway being constructed and arranged to telescopically receive said valve head and a portion of said valve shank therein with a close sliding clearance fit between said valve head and cap passageway such that said valve head is covered by said cap in a single stage fully installed position of said cap on said valve shank, said clip having a resilient detent member constructed to yieldably protrude inwardly into said passageway for detent engagement with said first head-shoulder junction to thereby prevent retrograde telescopic end-user removal of the cap from a telescopically fully installed position thereof on said valve head, said cap having internal splines constructed and arranged for co-rotational driving telescopic spline engagement with said valve shank spline portion when said cap is moved into the fully installed position on said valve shank.

43. The valve member of claim 41 in combination with a two-stage limiter cap for end-user-non-removable installation in surrounding relation over said valve head, said cap comprising a tubular body having a hollow interior and being open at least at one axial end, and a retainer clip end-user-non-removably carried within said body interior and defining therewith a hollow interior passageway open at least at one axial end closest to said body open end, said body and clip passageway being constructed and arranged to telescopically receive said valve head and a portion of said valve shank therein with a close sliding clearance fit between said valve head and cap passageway such that said valve head is covered by said cap in a fully installed second stage position of said cap on said valve shank, said clip having a resilient detent member constructed yieldably protrude inwardly into said passageway for successive detent engagement with said first and second head-shoulder junctions as said cap is telescoped progressively onto said valve head and shank to thereby prevent retrograde telescopic end-user removal of the cap initially from a partially installed first stage position thereof on said valve head wherein said cap is free to rotate on said valve and then from a second stage fully installed co-rotation position on said valve, said cap having internal splines constructed and arranged for co-rotational driving telescopic slide fit spline mesh engagement with said valve shank spline portion as said cap is moved into the fully installed second stage position of said cap on said valve shank, said cap open end being disposed adjacent said cap stop flange conical surface in the cap second stage position.

44. The valve and limiter cap combination of claim 43 wherein said clip detent member is oriented to be received adjacent said conically tapering portion of said shank groove portion in the fully installed second stage cap position, and wherein said clip detent member is oriented to be received against said secondary head conical surface portion in the partially installed first stage cap position.

45. The valve member of claim 44 wherein said secondary head portion conical surface has a fluted circumferential surface yieldably rotationally engageable with said clip detent member in the cap first stage position to thereby resist vibration forces tending to cause relative rotation between said valve member and cap when in the first stage position.

46. The combination of claim 42 wherein said retainer clip comprises an elongate strip of spring material telescopically inserted into the hollow interior of said single stage cap body and axially fixed therein when fully installed therein, and said detent member comprises a first barb joined integrally at one end to said strip and constructed to yieldably protrude at an opposite free end into the passageway interior in a free state condition of said first barb, said first barb being oriented to flex against said conically tapering portion of said shank groove portion and to engage at its free end said valve head shoulder junction to resist pull-off motion of said strip and hence said cap from said valve head in the single stage fully installed position of said cap on said valve.

47. The claim 46 wherein said clip retainer strip has a second barb joined integrally at one end to said strip and constructed to yieldably protrude at an opposite free end from said strip in a free state condition and oriented to engage said second barb free end with an internal cap shoulder junction defined by an internal recess in said cap body to thereby resist retrograde pull-off motion of said cap body from said strip in the single stage fully installed position of said strip in said cap body.

48. The combination of claim 47 wherein said clip strip and said barbs are formed as a one-piece stamping from a sheet of spring metal and said retainer clip strip comprises a hollow sleeve constructed and arranged to fit closely concentrically against the interior surface of said cap body defining the hollow interior thereof, said cap body having a wall closing the end thereof axially opposite said cap body open end, and wherein said cap body internal recess comprises a groove extending from said internal cap shoulder junction to an access opening in said cap body end wall whereby a special cap removal tool blade can be inserted into said groove to clear said second barb from said cap shoulder junction and thereby allow said cap to be pulled off of said retainer strip sleeve.

49. The combination of claim 42 wherein said cap stop shank flange has a generally conical surface tapering divergently away from said head and constructed and arranged for abutting said cap body open end to thereby hinder use of a pry tool against said shank flange for attempting to retrograde pry off said cap from said valve shank when in the fully installed single stage position thereon.

50. The combination of claim 43 wherein said retainer clip comprises an elongate strip of spring material telescopically inserted into the hollow interior of said cap body and axially fixed therein when fully installed therein, and said detent member comprises a first barb joined integrally at one end to said strip and constructed to yieldably protrude at an opposite free end into the passageway interior in a free state condition of said first barb, said barb being oriented to yieldably successively ride over said shank head portions during telescopic installation of said cap on said shank and to successively engage said first and second head-shoulder junctions to resist pull-off motion of said strip and hence said cap from said valve shank in both the first stage partially installed and second stage fully installed positions of said cap on said valve.

51. The combination of claim 50 wherein said secondary head portion conical surface is formed circumferentially to cooperate with said first barb in the partially installed first stage cap position to yieldably resist vibrational forces tending to cause relative rotation between said cap and valve.

52. In a carburetor having first and second jets, the combination of first and second side-by-side adjusting valve screws respectively operable in the carburetor for fuel flow control of said first and second jets, each screw having an adjusting head extending from the carburetor in exposed condition for jet adjustment, first and second open-ended limiter caps each having a rotational limiting means and being respectively individually telescopically received open-end first on said adjusting heads in laterally closely spaced side-by-side paired relation, and a paired-cap holder clip made of semi-resilient, non-elastic material resistant to damage by ozone and petroleum products and having first and second opposed end lobe portions respectively partially encircling and engaging said first and second caps and bight nip portions connected to said lobe portions and generally spanning the space between said caps, said caps and said holder clip lobe portions having interengaging means constructed and arranged such that said holder clip lobe portions hold said caps in laterally spaced parallel axis relationship, orient said caps for telescopic open-end first assembly onto said screw heads and yieldably resist rotation of said caps about their axes relative to said holder clip.

53. The combination of claim 52 wherein each of said cap rotation limiting means comprises a laterally exteriorly protruding limiter arm, said limiter arms being spaced from one another axially of said caps such that said cap holder clip encircles the pair of said caps axially between said cap limiter arms to thereby capture said cap holder clip axially between said limiter arms.

54. The combination of claim 52 wherein said interengaging means comprises cooperative recess and projection means on mating engagement surfaces of said holder clip end lobe portions and the associated one of said caps, and said cap holder clip is constructed of semi-resilient material to permit yieldably flexing of at least one of said clip bight portions to accommodate interference rotary ride-over engagement of said recess means relative to said projection means and thereby yieldably permit individual adjustment rotation of said caps within the associated lobe portions.

55. The combination of claim 52 wherein said valve screws and caps are of two stage installation construction, and wherein said cap holder clip has a stop leg protruding from the side thereof facing the carburetor and dimensioned relative to the valve screws and carburetor body such that a free end of the leg remote from said holder clip abuts the carburetor body when said caps and holder clip are arranged as a preoriented subassembly in and with said cap holder and are pushed onto said adjusting heads as such a subassembly to thereby prevent push-on movement of the subassembly past a predetermined first stage valve adjustment position wherein said caps are free to rotate on their associated valve screws.

56. The combination of claim 55 wherein said stop leg is integrally joined to said holder clip at one of said bight portions and the other of said bight portions is medially split to provide a parting gap therein to thereby form said other bight portion into a pair of spring cantilevered legs having free ends at the parting gap.

57. The combination set forth in claim 56 wherein said cap holder clip has limiter arm locking extension portions constructed and arranged to capture said limiter arm of each of said caps to lock said caps against rotation in said holder clip with said caps angularly oriented in a rich-rich preset position and with said caps fully telescopically inserted into said holder clip, and wherein said valves, carburetor body and holder clip stop leg are dimensioned such that when said stop leg abuts the carburetor body said caps are axially positioned by said holder clip in the first stage position wherein the caps are locked by the holder cap against rotation therein and are locked to the valve screw against pull off but the valve screw is free to rotate relative to said caps, said caps being axially slidable relative to said holder clip to permit them to be pushed further onto the valve screws while said holder clip is being held stationary by said clip leg to thereby reposition the caps into a second stage position so as to be again locked onto their valve screws against pull off but now rotatably drivingly engaged with their valve screws, said limiter arms being unlocked from said locking extension portions by cap travel to the second stage position to thereby permit rotation of said cap bodies for rotating the associated valve screws within the range permitted by said limiter arms.

58. The combination set forth in claim 52 wherein each of said cap rotation limiting means comprises a laterally exteriorly protruding limiter arm, and wherein said cap holder clip has limiter arm locking extension portions constructed and arranged to capture said limiter arm of each of said caps to lock said caps against rotation in said holder clip with said caps angularly oriented in a rich-rich preset position and with said caps fully telescopically slidably inserted into said holder clip in a first direction of relative motion therebetween such that said caps are axially positioned by said holder clip in the first stage position wherein the caps are locked by the holder cap against rotation therein and are locked to the valve screw against pull off but the valve screw is free to rotate relative to said caps, said caps and said holder clip being axially slidably relative to one another in a second direction of relative motion therebetween opposite to the first direction to permit said caps to be pushed further onto the valve screws to thereby reposition the caps into a second stage position so as to be again locked onto their valve screws against pull off but now rotatably drivingly engaged with their valve screws, said limiter arms being unlocked from said locking extension portion by axial motion of said caps relative to said holder clip in the second direction to thereby permit rotation of said cap bodies when in the second stage position for rotating the associated valve screws within the range permitted by said limiter arms.

59. A limiter cap holder clip of generally peanut shape in cross-section transverse to the axis of a limiter cap held by said holder clip, said holder clip having a pair of first and second end lobes constructed and arranged to respectively encircle most of the circumference of the respective cylindrical bodies of a pair of first and second limiter caps, said holder clip further having laterally spaced nip portions connected to said end lobes and generally spanning the space therebetween and adapted for holding two limiter caps in a paired side-by-side subassembly with said holder clip for telescopic installation and rotational orientation on respective valve shanks of a pair of carburetor-mounted needle valves.

60. The holder clip of claim 59 wherein one of said nip portions is split to form a parting gap therein to separate said one nip portion into first and second resiliently flexible spring legs respectively cantilevered from said first and second lobes.

61. The holder clip of claim 59 in combination with a pair of said limiter caps each having an exteriorly laterally protruding limiter arm, and wherein said body limiter arms are axially spaced from one another when said caps are oriented with their ends flush with one another, said holder clip being disposed between said arms axially of said caps such that said holder clip is captured on said caps by said arms flanking said holder clip.

62. The holder clip of claim 59 wherein said holder clip includes means adapted for resisting rotation of the caps on the needle shanks when being held by said holder clip.

63. A limiter cap holder clip for use with a carburetor having first and second jets and first and second side-by-side adjusting valve screws respectively operable in the carburetor for fuel flow control of the first and second jets, each screw having an adjusting head extending from the carburetor in exposed condition for jet adjustment, and for further use with first and second open-ended limiter caps each having a rotational limiting means and being respectively individually telescopically receivable open-end first on the screw adjusting heads in laterally closely spaced side-by-side paired relation, said holder clip being made of semi-resilient, non-elastic material resistant to damage by ozone and petroleum products and having first and second opposed end lobe portions respectively constructed and arranged for partially encircling and engaging the first and second caps, said holder clip further having bight nip portions connected to said lobe portions and generally spanning the space between said end lobe portions, said holder clip lobe portions having cap interengaging means constructed and arranged such that said holder clip lobe portions are adapted to hold the caps in laterally spaced parallel axis relationship, to orient the caps for telescopic open-end-first assembly onto the screw heads and to yieldably resist rotation of the caps about their axes relative to said holder clip.

64. The holder clip of claim 63 wherein each of the rotation limiting means of each of the caps comprises a laterally exteriorly protruding limiter arm, the limiter arms being spaced from one another axially of the caps when the caps are oriented flush with one another and wherein said cap holder clip is constructed and arranged to encircle the pair of the caps axially between the cap limiter arms to thereby capture said holder clip axially between the cap limiter arms.

65. The holder clip of claim 63 in further combination with said limiter caps, and wherein said lobe portions interengaging means comprises cooperative recess and projection means on mating engagement surfaces of said holder clip and lobe portions and the associated one of the caps, and said cap holder clip is constructed of semi-resilient material to permit yieldably flexing of at least one of said clip bight portions to accommodate interference rotary ride-over engagement of said recess means relative to said projection means and thereby yieldably permit individual adjustment rotation of said caps within the associated lobe portions.

66. The holder clip of claim 63 wherein the valve screws and caps are of two stage installation construction, and wherein said cap holder clip has a stop leg protruding from the side thereof facing the carburetor and dimensioned relative to the valve screws and carburetor body such that a free end of said stop leg remote from said holder clip is adapted to abut the carburetor body when the caps and said holder clip are arranged as a preoriented subassembly in and with said cap holder and are pushed onto said adjusting heads as such a subassembly so that said stop leg thereby prevents push-on movement of the subassembly past a predetermined first stage valve adjustment position wherein said caps are free to rotate on their associated valve screws.

67. The holder clip of claim 66 wherein said stop leg is integrally joined to said holder clip at one of said bight portions and the other of said bight portions is medially split to provide a parting gap therein to thereby form said other bight portion into a pair of spring cantilevered legs having free ends at the parting gap.

68. The holder clip set forth in claim 67 wherein said clip is adapted for use with the limiter caps each having a laterally exteriorly protruding limiter arm serving as the rotational limiting means, said holder clip having limiter arm locking extension portions constructed and arranged to capture said limiter arm of each of the caps to lock the caps against rotation in said holder clip with the caps angularly oriented in a rich-rich preset position and with the caps fully telescopically inserted into said holder clip, and wherein said holder clip stop leg is dimensioned relative to the screw valves and carburetor body such that when said stop leg abuts the carburetor body the caps are axially positioned by said holder clip in the first stage position wherein the caps are locked by the holder cap against rotation therein and are locked to the valve screw against pull off but the valve screw is free to rotate relative to said caps, said holder clip being constructed such that the caps are axially slidable relative to said holder clip to permit them to be pushed further onto the valve screws while said holder clip is being held stationary by said clip stop leg to thereby reposition the caps into a second stage position so as to be again locked onto their valve screws against pull off but now rotatably drivingly engaged with their valve screws, said locking extension portions being constructed such that the limiter arms are unlocked from said locking extension portions by cap travel to the second stage position to thereby permit rotation of the cap bodies for rotating the associated valve screws within the range permitted by the cap limiter arms.

* * * * *